(12) United States Patent
Suzuka et al.

(10) Patent No.: US 10,527,875 B2
(45) Date of Patent: Jan. 7, 2020

(54) OPTICAL DEVICE, OPTICAL DEVICE CONTROLLER, AND METHOD FOR MANUFACTURING OPTICAL DEVICE

(71) Applicant: PANASONIC INTELLECTUAL PROPERTY MANAGEMENT CO., LTD., Osaka (JP)

(72) Inventors: Yuko Suzuka, Osaka (JP); Masuyuki Ota, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 443 days.

(21) Appl. No.: 15/504,424

(22) PCT Filed: Oct. 15, 2015

(86) PCT No.: PCT/JP2015/005209
§ 371 (c)(1),
(2) Date: Feb. 16, 2017

(87) PCT Pub. No.: WO2016/063500
PCT Pub. Date: Apr. 28, 2016

(65) Prior Publication Data
US 2017/0235175 A1    Aug. 17, 2017

(30) Foreign Application Priority Data

Oct. 22, 2014  (JP) ................................ 2014-215673
Feb. 4, 2015  (JP) ................................ 2015-020180

(51) Int. Cl.
*G02F 1/133*  (2006.01)
*G02F 1/29*   (2006.01)
(Continued)

(52) U.S. Cl.
CPC .......... *G02F 1/13318* (2013.01); *G02F 1/137* (2013.01); *G02F 1/1339* (2013.01);
(Continued)

(58) Field of Classification Search
CPC . G02F 1/01; G02F 1/157; G02F 1/163; G02F 1/0121; G02F 1/025;
(Continued)

(56) References Cited

U.S. PATENT DOCUMENTS

2007/0058114 A1  3/2007 Niiyama et al.
2014/0218781 A1  8/2014 Kobayashi et al.

FOREIGN PATENT DOCUMENTS

JP    4-328722    11/1992
JP    5-289066    11/1993
(Continued)

OTHER PUBLICATIONS

Search Report issued in International Patent Application No. PCT/JP2015/005209, dated Dec. 22, 2015.
(Continued)

*Primary Examiner* — Collin X Beatty
*Assistant Examiner* — Grant A Gagnon
(74) *Attorney, Agent, or Firm* — Greenblum & Bernstein, P.L.C.

(57) ABSTRACT

An optical device includes a first electrode, a second electrode, a refractive index adjustment layer, and a textured layer. The first electrode is light-transmissive. The second electrode is light-transmissive and electrically paired with the first electrode. The refractive index adjustment layer is provided between the first electrode and the second electrode and has a refractive index that is adjustable in an arbitrary wavelength band from the visible light range to the near-infrared range. The textured layer gives the refractive index adjustment layer an uneven surface and is in the form (Continued)

of a film. The refractive index adjustment layer is variable between a transparent state and a state of distributing incident light.

32 Claims, 14 Drawing Sheets

(51) Int. Cl.
*G02F 1/137* (2006.01)
*G02F 1/1333* (2006.01)
*G02F 1/1339* (2006.01)
*G02F 1/1343* (2006.01)
*G02F 1/1347* (2006.01)
*G02F 1/1335* (2006.01)
G02F 1/1334 (2006.01)

(52) U.S. Cl.
CPC .... *G02F 1/13476* (2013.01); *G02F 1/133371* (2013.01); *G02F 1/133504* (2013.01); *G02F 1/134309* (2013.01); *G02F 1/29* (2013.01); G02F 2001/13345 (2013.01); G02F 2001/13398 (2013.01); G02F 2001/133302 (2013.01)

(58) Field of Classification Search
CPC ...... G02F 2203/10; G02F 1/155; G02F 1/011; G02F 1/03; G02F 1/161; G02F 2203/15; G02F 1/0018; G02F 1/0102; G02F 1/1334; G02F 1/1533; G02F 2001/0157; G02F 2202/32; G02F 1/015; G02F 1/017; G02F 1/0316; G02F 1/133308; G02F 1/133615; G02F 1/15; G02F 1/153; G02F 1/17; G02F 1/19; G02F 1/2257; G02F 1/29; G02F 1/292; G02F 2001/212; G02F 2201/307; G02F 2201/58; G02F 2202/10; G02F 2202/30; G02F 2203/055; G02F 2203/11; G02F 1/009; G02F 1/0126; G02F 1/0136; G02F 1/0322; G02F 1/0333; G02F 1/035; G02F 1/0356; G02F 1/05; G02F 1/13306; G02F 1/1333; G02F 1/13338; G02F 1/134336; G02F 1/167; G02F 1/225; G02F 1/2255; G02F 1/2955; G02F 1/3775; G02F 2001/1536; G02F 2001/1557; G02F 2001/213; G02F 2201/12; G02F 2202/28; G02F 2203/13; G02F 2203/48; G02F 1/00; G02F 1/0009; G02F 1/0027; G02F 1/0105; G02F 1/0107; G02F 1/01716; G02F 1/0305; G02F 1/0327; G02F 1/0353; G02F 1/0508; G02F 1/061; G02F 1/1313; G02F 1/1323; G02F 1/133305; G02F 1/13336; G02F 1/133385; G02F 1/13342; G02F 1/133502; G02F 1/133512; G02F 1/133514; G02F 1/133526; G02F 1/133553; G02F 1/133602; G02F 1/133606; G02F 1/133608; G02F 1/1339; G02F 1/134309; G02F 1/13624; G02F 1/13718; G02F 1/13737; G02F 1/13762; G02F 1/1393; G02F 1/1506; G02F 1/1508; G02F 1/15165; G02F 1/1523; G02F 1/1525; G02F 1/1676; G02F 1/1681; G02F 1/172; G02F 1/174; G02F 1/178; G02F 1/195; G02F 1/218; G02F 1/23; G02F 1/31; G02F 1/3133; G02F 1/35; G02F 1/3534; G02F 1/3544; G02F 1/3556; G02F 1/3558; G02F 2001/0151; G02F 2001/0152; G02F 2001/0155; G02F 2001/0156; G02F 2001/01791; G02F 2001/094; G02F 2001/13324; G02F 2001/133302; G02F 2001/133311; G02F 2001/133317; G02F 2001/13332; G02F 2001/133354; G02F 2001/133388; G02F 2001/133562; G02F 2001/133565; G02F 2001/134345; G02F 2001/13706; G02F 2001/15145; G02F 2001/1678; G02F 2001/294; G02F 2001/3503; G02F 2001/3505; G02F 2001/3507; G02F 2001/3548; G02F 2201/063; G02F 2201/07; G02F 2201/083; G02F 2201/122; G02F 2201/124; G02F 2201/126; G02F 2201/16; G02F 2201/34; G02F 2201/36; G02F 2201/38; G02F 2201/50; G02F 2201/52; G02F 2202/022; G02F 2202/046; G02F 2202/06; G02F 2202/108; G02F 2202/20; G02F 2202/36; G02F 2203/05; G02F 2203/12; G02F 2203/20; G02F 2203/21; G02F 2203/24; G02F 2203/50; G02F 2203/54; G02F 2203/58; G02F 2203/60; G02F 2203/62; G02F 2203/70; G02F 2/02; B60R 1/04; B60R 1/088; B60R 1/12; B60R 1/086; B60R 11/02; B60R 11/0235; B60R 1/02; B60R 1/084; B60R 2001/1215; B60R 2001/1223; B60R 2011/0033; B60R 1/1207
USPC ........................................................ 359/245
See application file for complete search history.

(56) References Cited

FOREIGN PATENT DOCUMENTS

| | | |
|---|---|---|
| JP | 6-324310 | 11/1994 |
| JP | 2007-102210 | 4/2007 |
| JP | 2011-002733 | 1/2011 |
| WO | 2012/118188 | 9/2012 |

OTHER PUBLICATIONS

U.S. Appl. No. 15/503,540 to Tomonori Yamada et al., filed Feb. 13, 2017.

OPTICAL DEVICE, OPTICAL DEVICE CONTROLLER, AND METHOD FOR MANUFACTURING OPTICAL DEVICE

TECHNICAL FIELD

The present disclosure relates to optical devices, optical device controllers, and methods for manufacturing optical devices. More specifically, the present disclosure relates to an optical device capable of changing from one optical state to another according to electricity, an optical device controller for controlling the optical device, and a method for manufacturing the optical device.

BACKGROUND ART

Optical devices, the optical state of which can be varied when supplied with electricity, have been proposed. For example, Patent Literature (PTL) 1 discloses a light-adjusting element that includes an electrolyte layer including an electrochromic material containing silver between a pair of transparent electrodes; and the pair of transparent electrodes between which the electrolyte layer is interposed and one of which includes nanoscale peaks and valleys. The light-adjusting element in PTL 1 can form a mirror state through the application of a voltage.

CITATION LIST

Patent Literature

PTL 1: International Publication No. 2012/118188

SUMMARY OF THE INVENTION

Technical Problem

The light-adjusting element in PTL 1 can form a mirror state, but is not configured to change the direction of travel of light to a desired direction.

An object of the present disclosure is to provide an optical device and an optical device controller that are capable of distributing light, and a method for manufacturing the optical device.

Solutions to Problem

The optical device according to an aspect of the present disclosure includes: a first electrode that is light-transmissive; a second electrode that is light-transmissive and electrically paired with the first electrode; a refractive index adjustment layer provided between the first electrode and the second electrode and having a refractive index that is adjustable in an arbitrary wavelength band from a visible light range to a near-infrared range; and a textured layer in the form of a film that gives the refractive index adjustment layer an uneven surface, wherein the refractive index adjustment layer is variable between a transparent state and a state of distributing incident light.

The optical device controller according to an aspect of the present disclosure includes: the optical device in which the refractive index of the refractive index adjustment layer in the near-infrared range is adjustable; at least one of a first sensor that detects an amount of near-infrared light that enters the optical device and a second sensor that detects an amount of near-infrared light that is emitted from the optical device; and a controller that controls a voltage between the first electrode and the second electrode according to the amount of near-infrared light detected by either one of the first sensor and the second sensor.

The method for manufacturing an optical device according to an aspect of the present disclosure is a method for manufacturing the optical device described above and includes: forming the first electrode and a resin layer on a first substrate; forming the textured layer from the resin layer by imprinting peaks and valleys into a surface of the resin layer after the formation of the resin layer; forming the second electrode on a second substrate; applying a material of the refractive index adjustment layer onto either one of (i) one of the textured layer and the first electrode and (ii) the second electrode; and bonding the first substrate and the second substrate together with the first electrode and the second electrode opposite each other.

Advantageous Effects of Invention

According to an aspect of the optical device and the optical device controller in the present disclosure, the transparent state and the light distribution state can be created according to a change in the refractive index of the refractive index adjustment layer. Thus, an optical device having good optical properties can be provided.

According to one aspect of the method for manufacturing an optical device in the present disclosure, an optical device having good optical properties can be manufactured.

DESCRIPTION OF EXEMPLARY EMBODIMENT

Figure 1:
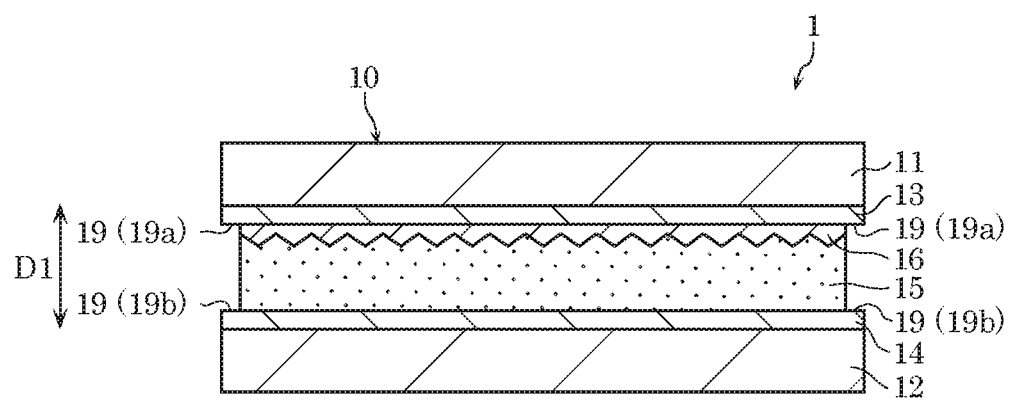
FIG. 1 is a cross-sectional view schematically illustrating an example of an optical device according to an embodiment.

Hereinafter, an embodiment of the present disclosure will be described with reference to the drawings. Each embodiment described below shows a specific preferred example of the present disclosure. The numerical values, shapes, materials, structural elements, the arrangement and connection of the structural elements, steps, the processing order of the steps etc. shown in the following embodiment are mere examples, and are not intended to limit the scope of the present disclosure. Furthermore, among the structural elements in the following embodiment, structural elements not recited in the independent claims indicating the broadest concepts of the present disclosure are described as arbitrary structural elements.

Note that the figures are schematic diagrams and are not necessarily precise illustrations. Furthermore, in the drawings, substantially identical elements are assigned the same reference signs, and overlapping description will be omitted or simplified.

FIG. 1 is a cross-sectional view schematically illustrating optical device 1 which is an example of an optical device according to an embodiment. In FIG. 1, a layer structure of optical device 1 is illustrated, and the actual size, etc., of each portion of optical device 1 is not limited to that in the illustration. Optical device 1 can be formed into a panel shape.

As illustrated in FIG. 1, optical device 1 according to the present embodiment includes first electrode 13, second electrode 14, refractive index adjustment layer 15, and textured layer 16.

First electrode 13 is light-transmissive. Second electrode 14 is an electrode that is electrically paired with first electrode 13 and is light-transmissive as with first electrode 13. Refractive index adjustment layer 15 is provided between first electrode 13 and second electrode 14 and has a refractive index that is adjustable in an arbitrary wavelength band from the visible light range to the near-infrared range. Optical device 1 in FIG. 1 is configured so that the refractive index of refractive index adjustment layer 15 only in the visible light range among the visible light range and the near-infrared range is adjustable. Textured layer 16 gives refractive index adjustment layer 15 an uneven surface and is in the form of a film. Refractive index adjustment layer 15 is variable between a transparent state and a state of distributing incident light (a light distribution state). Optical device 1 can create the transparent state and the light distribution state according to a change in the refractive index of refractive index adjustment layer 15. Thus, optical device 1 has good optical properties. Note that the transparent state is a state in which the optical device allows the passage of incident light without changing the direction of travel of the light. The light distribution state is a state in which light passing through the optical device is bent and is, for example, a state in which the optical device allows the passage of incident light by changing the direction of travel of the light.

Optical device 1 further includes first substrate 11 and second substrate 12. A layered structure of first electrode 13, textured layer 16, refractive index adjustment layer 15, and second electrode 14 is provided between first substrate 11 and second substrate 12. First substrate 11 and second substrate 12 support this layered structure. Furthermore, first substrate 11 and second substrate 12 protect this layered structure. Moreover, one of first substrate 11 and second substrate 12 functions as a base substrate on which the layered structure is formed, and the other functions as a cover substrate which covers the layered structure.

In optical device 1 in FIG. 1, first electrode 13, textured layer 16, refractive index adjustment layer 15, and second electrode 14 are provided in the stated order between first substrate 11 and second substrate 12. These are arranged in the thickness direction. A combined layered structure of first substrate 11, first electrode 13, textured layer 16, refractive index adjustment layer 15, second electrode 14, and second substrate 12 is optical adjuster 10. In other words, optical adjuster 10 includes first substrate 11, first electrode 13, textured layer 16, refractive index adjustment layer 15, second electrode 14, and second substrate 12. Optical adjuster 10 is embedded in optical device 1. Optical device 1 in FIG. 1 is optical adjuster 10 itself.

Herein, "the thickness direction" means the thickness direction of optical device 1 unless otherwise noted. In FIG. 1, the thickness direction is indicated by D1. The thickness direction may be a direction perpendicular to a surface of first substrate 11. The thickness direction includes a direction in which the members of optical adjuster 10 (the layered structure) are stacked. Specifically the thickness direction includes a direction from first electrode 13 toward second electrode 14 and a direction from second electrode 14 toward first electrode 13. In FIG. 1, the members of optical device 1 can be considered to spread laterally and in a direction perpendicular to the plane defined by the sheet of the drawing. The wording "plan view" means a view seen along the direction (thickness direction D1) perpendicular to the surface of first substrate 11 or second substrate 12.

Optical device 1 allows the passage of light. When optical device 1 is fitted onto an exterior wall of a building, outside light is allowed to enter the inside of the building. In this case, for example, optical device 1 is provided so that first substrate 11 is positioned on the outdoor side and second substrate 12 is positioned on the indoor side. Naturally optical device 1 may be provided so that second substrate 12 is positioned on the outdoor side and first substrate 11 is positioned on the indoor side. Optical device 1 may be fitted onto a part other than the exterior wall. For example, optical device 1 may be fitted onto an interior wall, a partition, or the like, or may be fitted as an on-vehicle window. First substrate 11 may serve as a substrate on the side on which light enters (on the light entry side). It is more advantageous to have textured layer 16 close to first substrate 11 rather than to second substrate 12.

First electrode 13 and second electrode 14 are configured to be able to apply an electric field to refractive index adjustment layer 15. One of first electrode 13 and second electrode 14 functions as an anode, and the other functions as a cathode. The refractive index of refractive index adjustment layer 15 changes through the application of a voltage by first electrode 13 and second electrode 14. First electrode 13 and second electrode 14 function as electrodes for driving optical device 1. First electrode 13 and second electrode 14 are in the form of layers.

First electrode 13 and second electrode 14 are made of a light-transmissive electrode material and can each be configured of for example, a transparent conductive layer. Transparent metal oxide, conductive particle-containing resin, a thin metal film, or the like can be used as a material of the transparent conductive layer, and transparent metal oxide such as indium tin oxide (ITO) or indium zinc oxide (IZO) is preferable as an electrode of optical device 1. First electrode 13 and second electrode 14 may each be a layer containing silver nanowire or a metal-containing transparent layer such as a thin silver film, or may be a stacked structure including a transparent metal oxide layer and a metal layer. First electrode 13 and second electrode 14 may be formed by providing an auxiliary line on a transparent conductive layer. Note that first electrode 13 and second electrode 14 may have the effect of shielding heat. With this, the thermal insulation properties of optical device 1 can improve.

At least one of first electrode 13 and second electrode 14 preferably contains metal. When metal is contained, the resistance of first electrode 13 and second electrode 14 can be reduced. With this, an electric current becomes more likely to flow evenly in a plane of optical device 1, and thus in-plane distribution of optical properties can improve. However, when a large amount of metal is contained, the light-transmitting properties of first electrode 13 and second electrode 14 are reduced, and therefore metal may be contained in an amount that does not cause adverse effects on the light-transmitting properties of first electrode 13 and second electrode 14. For example, metal can be contained in the form of a metal nanowire, a metal auxiliary line or a thin metal film in first electrode 13 and second electrode 14. The metal nanowire can be dispersed in the transparent conductive layer. In this case, first electrode 13 and second electrode 14 are each formed of a transparent conductive layer including a metal nanowire. The metal auxiliary line can be provided above the transparent conductive layer, in contact therewith. In this case, first electrode 13 and second electrode 14 include the transparent conductive layer and the auxiliary line. The thin metal film can be provided on a surface of the transparent conductive layer. In this case, first electrode 13 and second electrode 14 include the transparent conductive layer and the thin metal film. Note that one or both of first electrode 13 and second electrode 14 may contain metal. It is more preferred that both of first electrode 13 and second electrode 14 contain metal.

First electrode 13 and second electrode 14 are configured to be able to electrically connect to a power supply. In order to connect to the power supply optical device 1 can include an electrode pad or an electrical connection portion in which an electrode pad and the like are electrically collected, for example. The electrical connection portion can be configured of a plug or the like. These electrodes can be connected to the power supply through lines. The power supply may be an external power supply provided outside optical device 1 or may be an internal power supply embedded in optical device 1.

In optical device 1 in FIG. 1, at least one of first electrode 13 and second electrode 14 preferably includes electrode connection portion 19 extending beyond textured layer 16 in plan view. Electrode connection portion 19 can make it easier to provide electricity to first electrode 13 and second electrode 14. Electrode connection portion 19 is a portion that electrically connects first electrode 13, second electrode 14, and the lines. Electrode connection portion 19 can be easily connected to the lines. First electrode 13 and second electrode 14 are virtually extended by electrode connection portion 19, and therefore it becomes easy to lead out first electrode 13 and second electrode 14. Electrode connection portion 19 is exposed. Specifically electrode connection portion 19 does not need to be covered by textured layer 16 or refractive index adjustment layer 15. Electrode connection portion 19 for first electrode 13 is first electrode connection portion 19a, and electrode connection portion 19 for second electrode 14 is second electrode connection portion 19b. Optical device 1 in FIG. 1 includes both of first electrode connection portion 19a for first electrode 13 and second electrode connection portion 19b for second electrode 14. Thus, power is easily supplied to optical device 1.

First substrate 11 is provided outside first electrode 13. Second substrate 12 is provided outside second electrode 14. In the example in FIG. 1, first substrate 11 is in contact with first electrode 13, and second substrate 12 is in contact with second electrode 14. First substrate 11 and second substrate 12 are light-transmissive.

First substrate 11 and second substrate 12 may be bonded together at an end portion. For example, an adhesive is used to bond first substrate 11 and second substrate 12 together. In this case, the adhesive is preferably solidified. Furthermore, the adhesive can form a spacer that defines the thickness of the gap between first substrate 11 and second substrate 12. This spacer can protect an end portion of refractive index adjustment layer 15.

First substrate 11 and second substrate 12 may be configured using the same substrate material or may be configured using different substrate materials, but are preferably configured using the same substrate material. Examples of the substrate material include a glass substrate and a resin substrate. Examples of the material of the glass substrate include soda glass, alkali-free glass, and high refractive index glass. Examples of the material of the resin substrate include polyethylene terephthalate (PET) and polyethylene naphthalate (PEN). The glass substrate has the advantages of high transparency and moisture-proof properties. The resin substrate has the advantage of being less scattered upon breakage. First substrate 11 and second substrate 12 may be a flexible substrate instead of a rigid substrate. The flexible substrate can be bent and offers excellent handleability. The flexible substrate can be easily formed using a resin substrate or thin glass. Note that first substrate 11 and second substrate 12 may have the same thickness or may have different thicknesses. From the perspective of reducing the number of materials, it is preferred that first substrate 11 and second substrate 12 have the same thickness.

The difference in refractive index between first substrate 11 and first electrode 13 is preferably small in the visible light range. This allows light to effectively pass through the interface between first substrate 11 and first electrode 13. For example, the difference in refractive index between first substrate 11 and first electrode 13 is preferably 0.2 or less and more preferably 0.1 or less.

The difference in refractive index between second substrate 12 and second electrode 14 is also preferably small in the visible light range. This allows light to effectively pass through the interface between second substrate 12 and second electrode 14. For example, the difference in refractive index between second substrate 12 and second electrode 14 is preferably 0.2 or less and more preferably 0.1 or less.

First substrate 11 and second substrate 12 may have approximately the same refractive index; for example, the difference in refractive index between first substrate 11 and second substrate 12 may be 0.1 or less. First electrode 13 and second electrode 14 may have approximately the same refractive index; for example, the difference in refractive index between first electrode 13 and second electrode 14 may be 0.1 or less.

Note that the refractive index of first substrate 11 and the refractive index of second substrate 12 may be in the range of from 1.3 to 2.0, for example, but are not limited to this range. Likewise, the refractive index of first electrode 13 and the refractive index of second electrode 14 may be in the range of from 1.3 to 2.0, for example, but are not limited to this range.

In the example in FIG. 1, textured layer 16 is provided between first electrode 13 and refractive index adjustment layer 15. Textured layer 16 is in contact with first electrode 13. Furthermore, textured layer 16 is in contact with refractive index adjustment layer 15. Textured layer 16 has a textured surface and is in the form of a film. In the present disclosure, the film means an integrally spread element having a planar shape. Note that the film may be segmented at an appropriate point.

In the present embodiment, textured layer 16 is continuous in a planar pattern. Textured layer 16 includes no segmented region at least within a predetermined region that can be called a film (for example, a 1 cm by 1 cm region). Textured layer 16 may be formed so as to separate layers adjacent to each other in the thickness direction. In FIG. 1, textured layer 16 separates first electrode 13 and refractive index adjustment layer 15 from each other. First electrode 13 and refractive index adjustment layer 15 do not need to be in contact with each other. Textured layer 16 may cover an adjacent layer (first electrode 13 and/or refractive index adjustment layer 15).

In the example in FIG. 1, textured layer 16 has a flat surface on the first electrode 13 side and a textured surface on the refractive index adjustment layer 15 side, Textured layer 16 includes at least one of (i) a plurality of peaks and (ii) a plurality of valleys, and the textured surface is formed of these peaks and/or valleys. The textured surface may be structured so that the plurality of peaks protrude from a flat surface or may be structured so that the plurality of valleys are depressed from a flat surface or may be structured so that the plurality of peaks and the plurality of valleys are arranged from end to end to leave no flat surface.

In textured layer 16 illustrated in FIG. 1, the plurality of peaks protrude toward refractive index adjustment layer 15. The plurality of peaks may be regularly arranged or may be irregularly arranged. The plurality of peaks may be periodically arranged. The plurality of peaks may be arranged at equal intervals. The plurality of peaks may be randomly arranged.

Meanwhile, in textured layer 16, the plurality of valleys are depressed toward first electrode 13. The plurality of valleys may be regularly arranged or may be irregularly arranged. The plurality of valleys may be periodically arranged. The plurality of valleys may be arranged at equal intervals. The plurality of valleys may be randomly arranged.

In the case where optical device 1 is installed on a wall or the like as a window, the textured structure may be different between an upper part and a lower part of the window so that light can be appropriately distributed in each of the upper part and the lower part.

The peaks and valleys of textured layer 16 may be formed so that the intensity of distributed light is high in a specific direction. For example, peaks and valleys may be formed which cause light incident on optical device 1 to be more likely to travel in a specific oblique direction instead of spreading overall. With this, it is possible to cause light passing through optical device 1 to have different intensity according to the position. Such configuration is advantageous when optical device 1 is used as a window. The distribution of light passing through optical device 1 can be controlled according to the shape, arrangement, etc., of the peaks and/or valleys of textured layer 16. For example, the plurality of peaks and the plurality of valleys may be different in shape or in ratio of presence in the plane.

The light distribution operation by textured layer 16 can be evaluated in the method below. Light having a wavelength of 400 nm to 800 nm is caused to enter optical device 1 in the direction from first electrode 13 to second electrode 14 as incident light, and the direction of light that has passed through optical device 1 is evaluated on the second electrode 14 side. When the intensity of the light that has passed through optical device 1 is high in a specific direction at an angle different from the angle of the incident light, optical device 1 is regarded as being in the light distribution state. The direction of the light caused to enter optical device 1 may be a direction perpendicular to optical device 1. Sunlight may be incident not only in the perpendicular direction, but also in an oblique direction, with respect to a main surface of optical device 1, and therefore, when sunlight is incident in the oblique direction in the same or similar process and the intensity of light that has passed through optical device 1 is high in a specific direction at an angle different from the angle of the incident light, optical device 1 is regarded as being in the light distribution state.

The peak size (equal to the valley size) of textured layer 16 is defined as a protrusion height. The protrusion height of textured layer 16 is, for example, in the range of from 100 nm to 100 μm, but is not limited to this range. The protrusion height of textured layer 16 is the length from the bottom of the valley to the tip of the peak in the thickness direction.

In textured layer 16, the distance between a peak and another peak adjacent to that peak is, for example, in the range of from 100 nm to 100 μm, but is not limited to this range. The distance between a valley and another valley adjacent to that valley is, for example, in the range of from 100 nm to 100 μm, but is not limited to this range. The distance between a peak and another peak adjacent to that peak is defined as a pitch of the peaks and the valleys (a peak-valley pitch). The pitch of the peaks and the valleys based on the valleys is defined likewise. Light control tends to be good when microscale peaks and valleys are provided as textured layer 16. The peaks and valleys of textured layer 16 can be formed, for example, by nanoimprinting. Light control tends to be good when the peak-valley pitch is smaller than the protrusion height of textured layer 16. When the peak-valley pitch is smaller than the protrusion height of textured layer 16, however, time is needed for production in other peak and valley production processes such as photolithography, meaning that such production is difficult. In the case where imprinting is used to produce peaks and valleys, peaks and valleys with the peak-valley pitch smaller than the protrusion height can be easily produced. Note that the average of peak-valley pitches can be regarded as an average peak-valley cycle.

Textured layer 16 is light-transmissive. The difference in refractive index between textured layer 16 and first electrode 13 is preferably small. This allows light to effectively pass through the interface between textured layer 16 and first electrode 13. For example, the difference in refractive index between textured layer 16 and first electrode 13 is preferably 0.2 or less and more preferably 0.1 or less. The refractive index of textured layer 16 may be in the range of from 1.3 to 2.0, for example, but is not limited to this range.

In the example in FIG. 1, textured layer 16 is preferably electrically conductive. With this, the flow of electric current between first electrode 13 and second electrode 14 can be improved. Textured layer 16 may be formed using a material that is used for first electrode 13. In this case, first electrode 13 and textured layer 16 may be integrated using the same material. The textured surface, however, can be easily formed when first electrode 13 and textured layer 16 are separate bodies. Textured layer 16 is preferably formed using a material that allows the peaks and the valleys to be easily formed. Textured layer 16 can be formed using a material containing resin, for example. Examples of the resin material of textured layer 16 include conductive macromolecules and a conductor-containing resin. Examples of the conductive macromolecules include poly(3,4-ethylenedioxythiophene) (PEDOT). Examples of the conductor include Ag nanowire. The Ag nanowire may be mixed with resin such as cellulose or acrylic. In the case where a mixture material containing Ag nanowire and resin is used, it is possible to adjust the refractive index of textured layer 16 by the resin, and thus the refractive index of textured layer 16 can be easily brought close to the refractive index of first substrate 11, second substrate 12, refractive index adjustment layer 15, or the like. This improves the transparency of optical device 1. Note that when it is possible to apply a voltage, textured layer 16 may be formed using an insulating material. In this case, textured layer 16 can be formed using resin, an inorganic layer, or the like. Note that even in the case where textured layer 16 is an insulating layer, it is possible to apply a voltage between first electrode 13 and second electrode 14 when the difference in voltage between first electrode 13 and second electrode 14 is increased.

Refractive index adjustment layer 15 has a textured surface. The textured surface of refractive index adjustment layer 15 is formed by the textured surface of textured layer 16. Refractive index adjustment layer 15 is in contact with textured layer 16. A surface of refractive index adjustment layer 15 that faces textured layer 16 is the textured surface. The textured surface of refractive index adjustment layer 15 can be formed using the peaks and valleys of textured layer 16 as a die. Refractive index adjustment layer 15 includes at least one of (i) a plurality of peaks and (ii) a plurality of valleys. The peaks of refractive index adjustment layer 15 correspond to the valleys of textured layer 16, and the valleys of refractive index adjustment layer 15 correspond to the peaks of textured layer 16. The interface between refractive index adjustment layer 15 and textured layer 16 is a textured interface.

The textured interface between refractive index adjustment layer 15 and textured layer 16 may be configured so that light can be easily distributed. For example, the structure of the textured interface can be a microlens structure, a Fresnel lens structure, a protruding structure, or the like. With the Fresnel lens structure, the shape of the textured interface can be that obtained by dividing a lens shape into a plurality of sections. Accordingly, the intensity of light is easily increased in a specific direction by the textured interface like a lens. The textured interface may be of a saw-tooth cross-section. The structure of the textured interface may be a quarter dome lens structure. The structure of the textured interface may be a combination of these structures. Note that as described for textured layer 16, the textured interface may be formed so that light is distributed in a specific direction.

Refractive index adjustment layer 15 can be formed using a material having a refractive index that changes according to electricity. Specifically, refractive index adjustment layer 15 can be formed using a material having a refractive index that changes through the application of a voltage. Examples of the material having an adjustable refractive index include liquid crystals. Examples of the liquid crystals include nematic liquid crystals, cholesteric liquid crystals, and ferroelectric liquid crystals. The refractive index of the liquid crystals changes because the molecular orientation of the liquid crystals changes when the electric field changes.

The refractive index of refractive index adjustment layer 15 in the visible light range is preferably adjustable to (i) a refractive index close to the refractive index of textured layer 16 in the form of a film and (ii) a refractive index significantly different from the refractive index of textured layer 16 in the form of a film.

Refractive index adjustment layer 15 is variable between the following two states: a state in which the refractive index of refractive index adjustment layer 15 is close to the refractive index of textured layer 16; and a state in which the refractive index of refractive index adjustment layer 15 is significantly different from the refractive index of textured layer 16. In the state in which the refractive index of refractive index adjustment layer 15 is close to the refractive index of textured layer 16, the difference in refractive index between refractive index adjustment layer 15 and textured layer 16 is preferably 0.2 or less and more preferably 0.1 or less. In the state in which the refractive index of refractive index adjustment layer 15 is significantly different from the refractive index of textured layer 16, the difference in refractive index between refractive index adjustment layer 15 and textured layer 16 is preferably more than 0.1 and more preferably 0.2 or more.

In one implementation, the refractive index of refractive index adjustment layer 15 approaches the refractive index of textured layer 16 when a voltage is applied, and the difference in refractive index between refractive index adjustment layer 15 and textured layer 16 increases when no voltage is applied. Refractive index adjustment layer 15 can be placed into the non-light distribution state (the transparent state) when the difference in refractive index between refractive index adjustment layer 15 and textured layer 16 is small and can be placed into the light distribution state when the difference in refractive index between refractive index adjustment layer 15 and textured layer 16 is large.

In another implementation, refractive index adjustment layer 15 is placed into the light distribution state as a result of an increase in the difference in refractive index between refractive index adjustment layer 15 and textured layer 16 when a voltage is applied, and refractive index adjustment layer 15 is placed into the non-light distribution state (the transparent state) as a result of the refractive index of refractive index adjustment layer 15 approaching the refractive index of textured layer 16 when no voltage is applied.

As the material of refractive index adjustment layer 15, a liquid crystal material having an anisotropic refractive index is preferably used. In the case where a liquid crystal material having an anisotropic refractive index is used as refractive index adjustment layer 15, when a voltage is applied so that liquid crystal molecules are perpendicularly oriented, refractive index adjustment layer 15 is less likely to have anisotropy that is due to polarized outside light. Thus, the transparency in the transparent state improves. In order to improve the transparency, the difference between the refractive index of the perpendicularly oriented liquid crystals and the refractive index of textured layer 16 are preferably reduced.

In one preferred implementation, the refractive index of refractive index adjustment layer 15 is smaller than the refractive index of textured layer 16 when the difference in the refractive index between refractive index adjustment layer 15 and textured layer 16 is large. With this, the direction of travel of light can be easily changed. In one preferred implementation, the refractive index of refractive index adjustment layer 15 is greater than the refractive index of textured layer 16 when the difference in the refractive index between refractive index adjustment layer 15 and textured layer 16 is large. With this, the direction of travel of light can be easily changed. How the refractive index of refractive index adjustment layer 15 changes can be set according to a target light distribution.

Refractive index adjustment layer 15 may be supplied with power from an alternate-current power supply or may be supplied with power from a direct-current power supply, but preferably is supplied with power from an alternate-current power supply. With many of the materials having a refractive index that changes through the application of a voltage, the state at the time of application of a voltage cannot be maintained after time has passed since the start of the application of the voltage. An alternate-current power supply is capable of alternately applying voltages in opposite directions and thus is capable of substantially continuing to apply a voltage by changing the direction of the voltage. In this case, the waveform of the alternate current is preferably a rectangular wave. With this, a constant voltage is likely to be applied, and thus the state after the refractive index is changed can be more likely to be stabilized. Note that the waveform of the alternate current may be a pulse wave.

In one preferred implementation, the state of refractive index adjustment layer 15 when a voltage is applied is maintained. This means that a voltage is applied when a change in the refractive index is desired, but it is not necessary to apply a voltage when no change in the refractive index is desired, and thus the power efficiency improves.

The properties of maintaining a refractive index without changes are called hysteresis, and the hysteresis can be seen as a result of application of a voltage equal to or higher than a predetermined voltage. The longer the period of time in which the refractive index is maintained, the better; for example, 10 minutes or more is preferable, 30 minutes or more is more preferable, one hour or more is still more preferable, 12 hours or more is yet more preferable, and 24 hours or more is far more preferable. Note that the properties of maintaining a refractive index are also called storage properties (memory properties).

Figure 2:
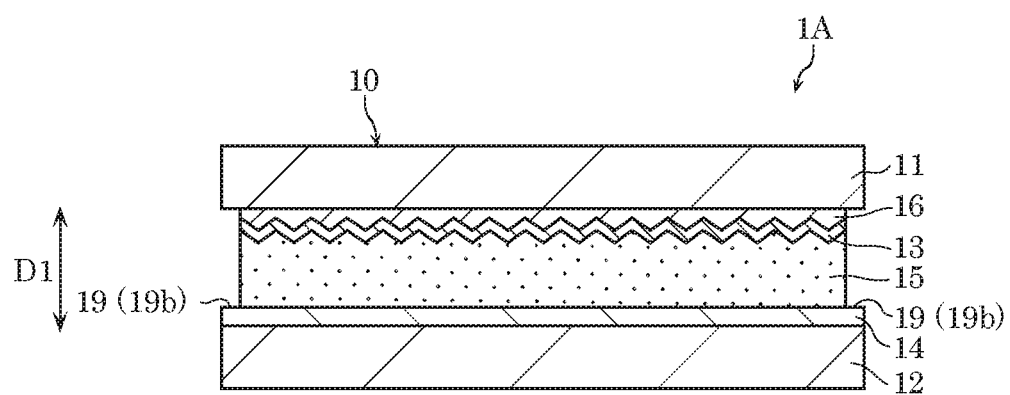
FIG. 2 is a cross-sectional view schematically illustrating an example of an optical device according to Variation 1 of an embodiment.

FIG. 2 is a cross-sectional view schematically illustrating an example of optical device 1A according to Variation 1 of the embodiment.

As illustrated in FIG. 2, optical device 1A in the present variation is different from optical device 1 illustrated in FIG. 1 in the arrangement of textured layer 16 and first electrode 13. In optical device 1A illustrated in FIG. 2, textured layer 16, first electrode 13, refractive index adjustment layer 15, and second electrode 14 are arranged in the stated order from first substrate 11 toward second substrate 12.

In the example in FIG. 2, first electrode 13 is provided between textured layer 16 and refractive index adjustment layer 15. Textured layer 16 is provided between first substrate 11 and first electrode 13. First electrode 13 has a textured surface. Specifically the shape of first electrode 13 follows the shape of textured layer 16, and a surface of first electrode 13 that faces refractive index adjustment layer 15 is the textured surface. Textured layer 16 is in the form of a film and gives refractive index adjustment layer 15 an uneven surface in optical device 1A illustrated in FIG. 2 as well. However, the textured surface is provided to refractive index adjustment layer 15 via first electrode 13.

The shape of textured layer 16 can be the same as or similar to that described in FIG. 1; the above description can apply to the shape of textured layer 16. For example, textured layer 16 can include at least one of (i) a plurality of peaks and (ii) a plurality of valleys. In this case, the peaks protrude toward first electrode 13, and the valleys are depressed toward first substrate 11. The interface between refractive index adjustment layer 15 and first electrode 13 is a textured interface. The structure of the textured interface can be the same as or similar to the structure described above. A preferred implementation of textured layer 16 illustrated in FIG. 2 is described using different names of layers that appropriately depend on the position of each layer with reference to textured layer 16 described in the example in FIG. 1.

In the example in FIG. 2, textured layer 16 may be electrically conductive or may be electrically non-conductive. Since first electrode 13 and refractive index adjustment layer 15 are in contact with each other, power can be supplied even when textured layer 16 is electrically non-conductive. In the case where textured layer 16 is electrically conductive, textured layer 16 can supplement the electrical conductivity of first electrode 13. Textured layer 16 is preferably formed using a material that allows the peaks and the valleys to be easily formed. Textured layer 16 can be formed using a material containing resin, for example.

A textured interface is provided between first electrode 13 and textured layer 16. In the present variation, first electrode 13 have opposite textured surfaces. The surface of first electrode 13 that faces refractive index adjustment layer 15 is a textured surface. First electrode 13 can be stacked on a surface of textured layer 16. As a result of first electrode 13 being formed on textured layer 16, the textured surfaces of first electrode 13 are formed.

Refractive index adjustment layer 15 has a textured surface in the present variation as well. Note that the textured surface of refractive index adjustment layer 15 is formed by the textured surface of first electrode 13. Refractive index adjustment layer 15 and first electrode 13 are in contact with each other. A specific implementation of refractive index adjustment layer 15 may be the same as that described with reference to FIG. 1.

The structure in which textured layer 16 is in contact with refractive index adjustment layer 15 such as that in FIG. 1 is defined as a direct peak-valley-forming structure. The structure in which first electrode 13 is present between textured layer 16 and refractive index adjustment layer 15 such as that in FIG. 2 is defined as an indirect peak-valley-forming structure. In this way the textured interface is formed in contact with refractive index adjustment layer 15, and thus the distribution of light can be controlled. The direct peak-valley-forming structure has the advantage that the textured surface can be more easily formed than in the indirect peak-valley-forming structure. In the direct peak-valley-forming structure, however, textured layer 16 is required to be configured so that an electric current flows between first electrode 13 and second electrode 14. In contrast, the indirect peak-valley-forming structure has the advantage that it is more easily ensured than with the direct peak-valley-forming structure that an electric current flows between first electrode 13 and second electrode 14. Furthermore, in the indirect peak-valley-forming structure, first electrode 13 is separated from first substrate 11, and thus the difference in the refractive index between first electrode 13 and first substrate 11 has less impact. In the indirect peak-valley-forming structure, however, first electrode 13 is required to be formed into a shape following the shape of textured layer 16. Although optical device 1 having the direct peak-valley-forming structure exemplified by that in FIG. 1 will be mainly described below, the description below can also be applied to the indirect peak-valley-forming structure exemplified by that illustrated in FIG. 2.

Figure 3A:
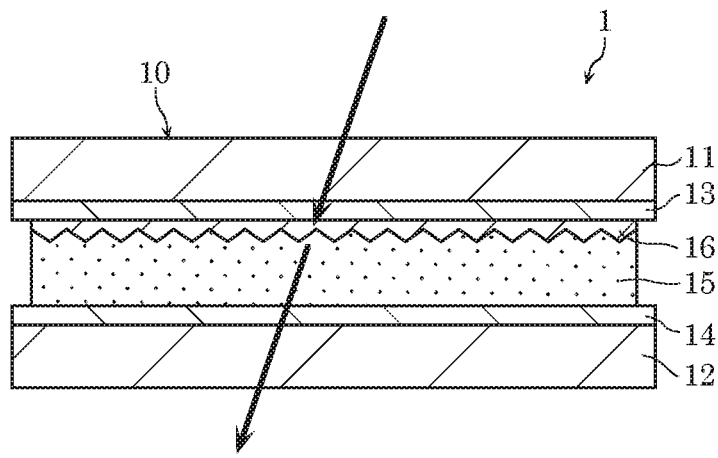
FIG. 3A illustrates an example of an optical device in a transparent state according to an embodiment.
Figure 3B:
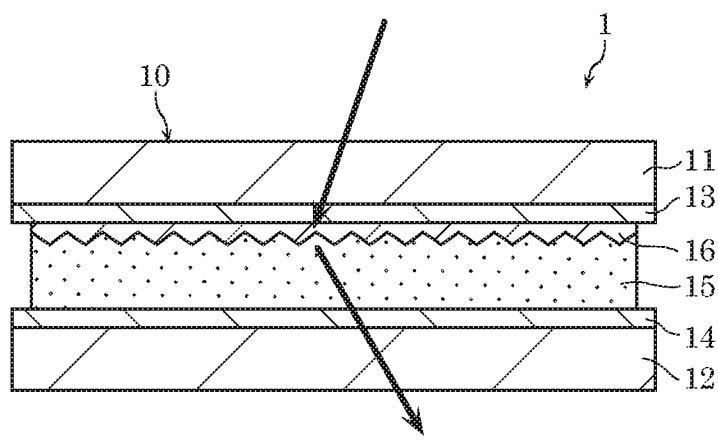
FIG. 3B illustrates an example of an optical device in a light distribution state according to an embodiment.
Figure 3C:
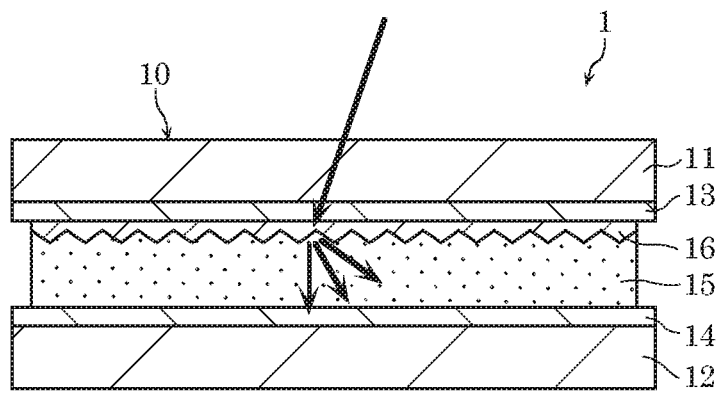
FIG. 3C illustrates an example of an optical device in a scattered state according to an embodiment.

Next, the optical properties of optical device 1 according to the embodiment will be described with reference to FIG. 3A to FIG. 3C. FIG. 3A to FIG. 3C illustrate the optical properties of optical device 1 according to the embodiment. FIG. 3A illustrates an example of optical device 1 in a transparent state, FIG. 3B illustrates an example of optical device 1 in a light distribution state, and FIG. 3C illustrates an example of optical device 1 in a scattered state. Note that optical device 1 changes at least between the transparent state illustrated in FIG. 3A and the light distribution state illustrated in FIG. 3B.

FIG. 3A illustrates the traveling light when optical device 1 is in the transparent state. In FIG. 3A, light is indicated by arrows. Light can travel in a direction oblique to the direction (the same direction as the thickness direction) perpendicular to the surface of optical device 1. Especially when optical device 1 is a window, light is likely to be incident at an angle to optical device 1. Light passing through optical device 1 in the transparent state travels straight ahead. For example, when light from outside (outside light) is incident on optical device 1, the outside light remains in its original direction upon entering the inside.

FIG. 3B illustrates the traveling light when optical device 1 is in the light distribution state. In FIG. 3B, light is indicated by arrows. When optical device 1 is in the light distribution state, the direction of travel of light incident on optical device 1 is changed inside optical device 1. The direction of travel of the light can be changed on the interface between textured layer 16 and refractive index adjustment layer 15. Optical device 1 can change the direction of travel of light into a target direction. Thus, light can be distributed in optical device 1. In FIG. 3B, the direction of travel of light is changed from the direction toward optical device 1 to the backward direction (the rebound direction). Specifically in FIG. 3B, the light that has traveled at an angle from right to left passes through optical device 1 and then travels at an angle from left to right. In this way, when light is bent in the backward direction, optical device 1 having better optical properties can be obtained.

Optical device 1 is placed in the transparent state (FIG. 3A) as a result of matching between the refractive index of refractive index adjustment layer 15 and the refractive index of a layer that is in contact with refractive index adjustment layer 15 at the textured interface. The layer that is in contact with refractive index adjustment layer 15 at the textured interface is defined as a textured-interface adjacent layer. As illustrated in FIG. 3A, the textured-interface adjacent layer is textured layer 16 in the case of the direct peak-valley-forming structure. Note that FIG. 2 shows that the textured-interface adjacent layer is first electrode 13 in the case of the indirect peak-valley-forming structure. As the difference in the refractive index between the textured-interface adjacent layer and refractive index adjustment layer 15 decreases, the change in the direction of travel of light due to the difference in the refractive index decreases. When the difference in the refractive index between the textured-interface adjacent layer and refractive index adjustment layer 15 is eliminated or becomes negligible, a change in the travel of light due to the difference in the refractive index rarely occurs, and a change in the travel of light at the textured interface also rarely occurs. Thus, the direction of travel of light is maintained when the light passes through the textured interface.

Optical device 1 is placed in the light distribution state (FIG. 3B) due to mismatching between the refractive index of refractive index adjustment layer 15 and the refractive index of the textured-interface adjacent layer (textured layer 16 in FIG. 3B). When the difference in the refractive index between the textured-interface adjacent layer and refractive index adjustment layer 15 is large, the direction of travel of light is likely to change due to the difference in the refractive index, and furthermore, a change in the direction of travel of the light at the textured interface is added, allowing a change in the direction of travel of the light so that the light is bent. And it is possible to cause the light to travel in a target direction by controlling the difference in the refractive index between the textured-interface adjacent layer and refractive index adjustment layer 15. Although FIG. 3B schematically depicts the direction of travel of light that is bent in one direction, the light may travel in a diffused manner. Note that light may be distributed in such a way that the amount of light in a target direction among the components of light increases. When the amount of light in a specific direction increases, the optical properties improve.

In a preferred implementation, optical device 1 is placed in the transparent state through the application of a voltage. The orientations of substances in refractive index adjustment layer 15 are aligned through the application of a voltage so that the difference in the refractive index between the textured-interface adjacent layer and refractive index adjustment layer 15 is reduced, and thus the transparency can be obtained. Note that optical device 1 may be placed in the light distribution state when the application of the voltage is stopped. The optical state after the voltage is changed may be maintained. The properties that allow the optical state to be maintained are called hysteresis. Such properties are also called storage properties (memory properties).

FIG. 3C illustrates optical device 1 exhibiting light scattering properties. In a preferred implementation of optical device 1, refractive index adjustment layer 15 has variable light scattering properties. It is possible to create an optical state different from that described above due to a change in the light scattering properties, and thus optical device 1 having good optical properties can be obtained. In FIG. 3C, light is scattered by optical device 1.

Refractive index adjustment layer 15 can be given the light scattering properties according to the change in the voltage. For example, the value of the voltage to be applied to refractive index adjustment layer 15 can be changed for switching between the transparent state, the light distribution state, and the scattered state. When the refractive index of refractive index adjustment layer 15 changes, light can be scattered at the textured interface. The light scattering properties can be considered as one type of light distribution, but light distribution herein means changing the direction of travel of light to a specific direction other than the straight-ahead direction, and scattering herein means diffusing light for weakening the directionality of the light. FIG. 3B schematically shows that a component of light that is bent to the right is large as indicated by the arrow. In this regard, FIG. 3C schematically shows that components of light are scattered while the light is bent to the right as a whole, as indicated by the arrows.

When optical device 1 is in the scattered state, light is scattered while traveling, and thus the travel of strong light can be suppressed. Specifically, light may be glaring if strong light travels as it is as in FIG. 3A and FIG. 3B, but glare can be reduced by scattering light as in FIG. 3C. In the scattered state, optical device 1 can be in the form of frosted glass. Furthermore, scattering of light allows optical device 1 to become translucent or opaque, and therefore providing the scattering properties is advantageous in the case where the opposite side of optical device 1 needs to be shielded from view. When the scattering properties are enhanced, an object placed on the opposite side of optical device 1 can be less visible. Reduced visibility makes it possible to protect privacy. When optical device 1 is in the scattered state, light is scattered while passing through optical device 1.

It is preferred that refractive index adjustment layer 15 can exhibit the light scattering properties in the state in which incident light is distributed. By applying the light distribution properties and the light scattering properties to incident light, optical device 1 is capable of diffusing light while outputting light in a desired direction of travel. The scattering of light can reduce the glare of light in the direction in which light is output. In this case, the optical axis of incident light and the output axis of emitted light can be non-parallel. If the light scattering properties are too strong and light is output alike in all directions, the effects of light distribution may fail to be obtained, and thus the light scattering properties can be reduced to an extent that the light distribution properties can be exhibited. The haze, which is an index of the light scattering properties, is preferably in the range of from 10% to 60%. In FIG. 3C, light incident obliquely downward to the left on optical device 1 travels, as a whole, obliquely downward to the right as a result of being distributed by optical device 1, and at the same time, is scattered by optical device 1. FIG. 3C shows the state in which the light distribution properties and the light scattering properties are both exhibited.

The light scattering properties can be provided by a method other than by the electric field. When the light scattering properties can be provided by a method other than by the electric field, independent control of the light distribution and the scattering becomes easy making it possible to increase the optical variety. For example, air bubbles can be introduced into refractive index adjustment layer 15 to provide the light scattering properties to refractive index adjustment layer 15. The surfaces of the air bubbles become the interface that scatters light. The air bubbles can be generated by gas injection. Examples of the gas include the air, nitrogen, helium, and argon. As the gas, inert gas is preferable. In order to switch between exhibiting and not exhibiting the light scattering properties, air bubbles that can disappear are preferable. For example, refractive index adjustment layer 15 is formed as a layer having fluidity and bubbles are continuously injected into this layer, and thus refractive index adjustment layer 15 that contains air bubbles is obtained. The air bubbles can disappear after moving in refractive index adjustment layer 15, but the supply of new air bubbles allows refractive index adjustment layer 15 to contain air bubbles as a whole. The air bubbles can be generated by a pump, for example. When formation of the air bubbles is stopped, the air bubbles in refractive index adjustment layer 15 disappear, meaning that refractive index adjustment layer 15 no longer has the light scattering properties and is no longer in the scattered state. The formation of the air bubbles can have an impact on the refractive index, but the refractive index can be adjusted by setting an electric field taking the air bubbles into account. Providing the light scattering properties by forming air bubbles, however, may increase the complexity of device configuration. Therefore, the light scattering properties are preferably changed by the electric field.

Optical device 1 may be configured to switch between the transparent state in FIG. 3A and the scattered state in FIG. 3C without the light distribution specialized in a specific direction such as that in FIG. 3B. Since the scattered state in FIG. 3C can be called one type of light distribution as described above, optical device 1 can be considered as being variable between the transparent state and the light distribution state in this case as well. However, it is preferable to have the light distribution properties that strengthen light in a specific direction.

The scattered state in FIG. 3C results from mismatching between the refractive index of refractive index adjustment layer 15 and the refractive index of the textured-interface adjacent layer (textured layer 16 in FIG. 3B). When the difference in the refractive index between the textured-interface adjacent layer and refractive index adjustment layer 15 is large, the direction of travel of light is likely to change due to the difference in the refractive index, and furthermore, a change in the direction of travel of the light at the textured interface is added, allowing a change in the direction of the light so that the light is scattered. And it is possible to control the scattering of the light to a target extent by controlling the difference in the refractive index between the textured-interface adjacent layer and refractive index adjustment layer 15.

It is preferred that the light distribution properties, the transparency, and the like of optical device 1 be gradually changed. Accordingly variations of various optical states can be created, and thus it is possible to improve the properties of optical device 1. For example, the light distribution properties can be gradually changed by gradually changing the value of the voltage. The light distribution properties may be gradually changed in a continuous manner or may be gradually changed in a stepwise manner. When the light distribution can be changed to weak light distribution and strong light distribution, the optical properties improve. The same applies to the light scattering properties; it is preferred that the light scattering properties of optical device 1 be gradually changed.

Japanese Unexamined Patent Application Publication H04-328722 (PTL 2) discloses a scattering liquid crystal device that switches between a transmission mode and a scattering mode by the electric field. This device transitions from the scattering mode to the transmission mode by matching the refractive index of a grating (a diffraction grating) and the refractive index of a liquid crystal layer through the application of a voltage. This device has an object to increase the contrast and luminance of a projection image. The grating is, however, not in the form of a film, but in the form of stripes or a grid. Therefore, this device has a low chance of having high light distribution properties.

In this regard, optical device 1 in the present disclosure includes textured layer 16 in the form of a film and allows light to pass through the film. This easily leads to a structure that exhibits high light distribution properties. Furthermore, the area of optical device 1 in the present disclosure can be easily increased (for example, at least the size of 100 mm by 100 mm or at least the size of 500 mm by 500 mm). Moreover, optical device 1 can be easily produced because it is possible to produce the peaks and the valleys by a method such as imprinting. In addition, optical device 1 in the present disclosure can be applied to windows.

Figure 4:
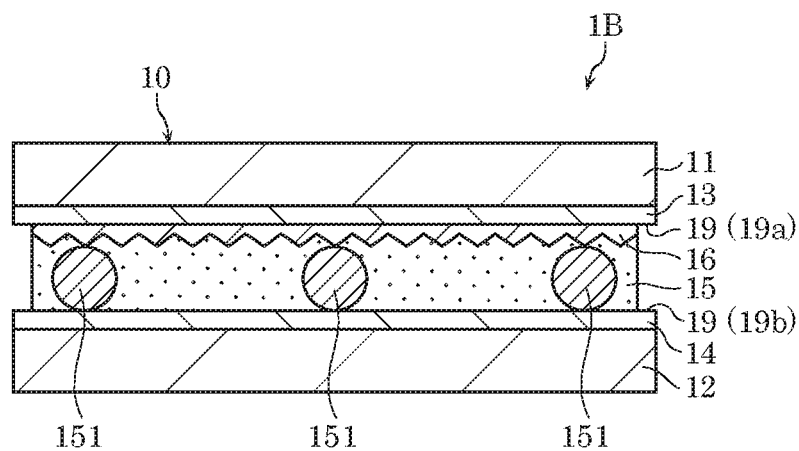
FIG. 4 is a cross-sectional view schematically illustrating an example of an optical device according to Variation 2 of an embodiment.

A preferred implementation of refractive index adjustment layer 15 will be described with reference to FIG. 4. FIG. 4 is a cross-sectional view schematically illustrating an example of optical device 1B according to Variation 2 of the embodiment. Although an example of the direct peak-valley-forming structure is illustrated in FIG. 4, the description below can also be applied to the indirect peak-valley-forming structure (see FIG. 2). In FIG. 4, a preferred implementation of defining of the thickness of refractive index adjustment layer 15 is schematically illustrated.

In optical device 1B according to the present variation, refractive index adjustment layer 15 includes spacer 151. Spacer 151 is larger than the pitch of the peaks and valleys of textured layer 16. Spacer 151 defines the thickness of refractive index adjustment layer 15. Regarding the issue that optical devices are required to include refractive index adjustment layer 15 having a thickness that allows light to be favorably distributed, the use of spacer 151 easily ensures that refractive index adjustment layer 15 has such a thickness. The number of spacers 151 is at least one and is preferably more than one. In FIG. 4, refractive index adjustment layer 15 includes a plurality of spacers 151. Spacers 151 can more reliably ensure that refractive index adjustment layer 15 has a sufficient thickness. Spacer 151 that is larger than the pitch of the peaks and valleys of textured layer 16 is unlikely to wedge itself between the peaks and the valleys, and thus easily ensures that refractive index adjustment layer 15 has a sufficient thickness. The size of spacer 151 is greater than the peak-valley pitch. The thickness of refractive index adjustment layer 15 can be made more uniform with the use of more than one spacer 151.

Spacer 151 is preferably a particle. A plurality of particles contained in the material of refractive index adjustment layer 15 may serve as the plurality of spacers 151. Examples of the particle can include an inorganic particle and an organic particle. Examples of the organic particle include a silica particle. The particle is preferably in the form of a sphere. The form of a sphere includes not only the shape of a perfect sphere, but also the shape that can be recognized as spherical. The plurality of particles preferably have equal grain diameters. When the plurality of particles have equal grain diameters, the thickness of refractive index adjustment layer 15 is stabilized. For example, when the grain diameters of 95% or more particles are within plus and minus 10% of the average grain diameter, the plurality of particles can be regarded as having equal grain diameters.

In FIG. 4, spacer 151 is in contact with textured layer 16 and second electrode 14. Upon forming optical device 1B, textured layer 16 and second electrode 14 are relatively moved toward each other, and thus refractive index adjustment layer 15 is provided. At this time, by providing spacer 151, it is possible to prevent textured layer 16 and second electrode 14 from coming so close to each other that the distance therebetween is less than the size of spacer 151. Since the spacer 151 is of a size that is unlikely to wedge itself between the peaks and valleys of textured layer 16, it is possible to ensure that refractive index adjustment layer 15 has a sufficient thickness. Note that in the case where spacer 151 is used in the variation in FIG. 2, spacer 151 may be in contact with first electrode 13 and second electrode 14.

Spacer 151 can be applied to any of the implementations described above and below. For example, refractive index adjustment layer 15 may contain a macromolecular material and spacer 151.

Figure 5:
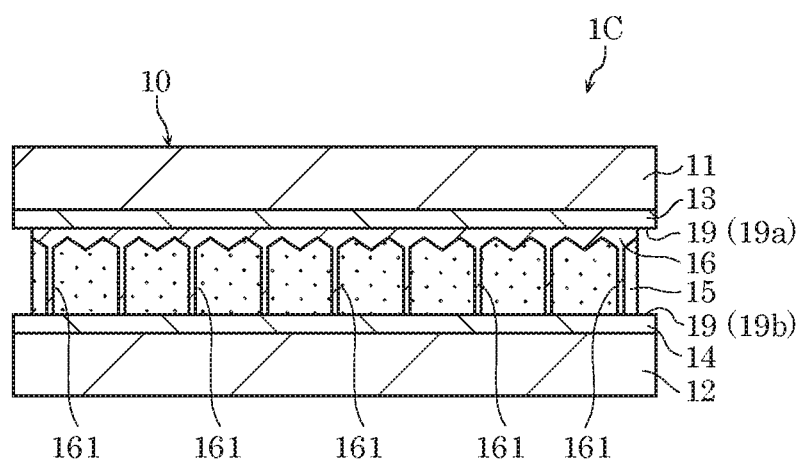
FIG. 5 is a cross-sectional view schematically illustrating an example of an optical device according to Variation 3 of an embodiment.

A preferred implementation of textured layer 16 will be described with reference to FIG. 5. FIG. 5 is a cross-sectional view schematically illustrating an example of optical device 1C according to Variation 3 of the embodiment. In FIG. 5, a preferred implementation of defining of the thickness of refractive index adjustment layer 15 is schematically illustrated.

As illustrated in FIG. 5, in optical device 1C according to the present variation, textured layer 16 includes a plurality of columns 161. The plurality of columns 161 penetrate refractive index adjustment layer 15 and are in contact with second electrode 14. The plurality of columns 161 define the thickness of refractive index adjustment layer 15. Regarding the issue that optical devices are required to include refractive index adjustment layer 15 having a thickness that allows light to be favorably distributed, providing the plurality of columns 161 easily ensures that refractive index adjustment layer 15 has such a thickness. In FIG. 5, extensions of protruding portions of textured layer 16 form the plurality of columns 161. The plurality of columns 161 are in the form of a circular columns, rectangular columns, or the like.

The plurality of columns 161 can be formed by shaping textured layer 16 so that a portion of textured layer 16 protrudes upon forming textured layer 16. Column 161 preferably extends linearly along the thickness direction of optical device 1C.

In FIG. 5, the tips of the plurality of columns 161 are in contact with second electrode 14. In other words, textured layer 16 is in contact with second electrode 14. Upon forming optical device 1C, textured layer 16 and second electrode 14 are relatively moved toward each other, and thus refractive index adjustment layer 15 is provided. At this time, by providing the plurality of columns 161, it is possible to prevent textured layer 16 and second electrode 14 from coming so close to each other that the distance therebetween is less than the length of the plurality of columns 161. The plurality of columns 161 can support second electrode 14. Refractive index adjustment layer 15 can be provided around the plurality of columns 161. The plurality of columns 161 are provided in refractive index adjustment layer 15. The plurality of columns 161 function as a spacer. The tips of the plurality of columns 161 are preferably at the same position in the thickness direction. Providing more than one column 161 increases the strength of the plurality of columns 161, allowing the thickness of refractive index adjustment layer 15 to be easily defined. In the case where the plurality of columns 161 are present, the thickness of refractive index adjustment layer 15 can be easily defined even when spacers such as that described above are not included in refractive index adjustment layer 15. Thus, optical device 1 can be easily produced.

The plurality of columns 161 can be applied to any of the implementations described above and below. For example, the plurality of columns 161 may penetrate refractive index adjustment layer 15 containing a macromolecular material. The plurality of columns 161 are effective in the case where textured layer 16 and refractive index adjustment layer 15 are in contact with each other.

Figure 6A:
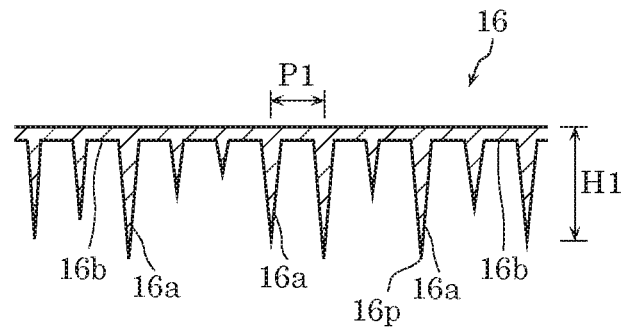
FIG. 6A illustrates a first variation configuration of a textured layer (of random height) in an optical device according to an embodiment.
Figure 6B:
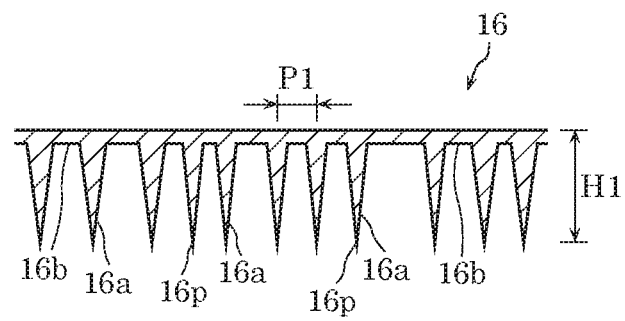
FIG. 6B illustrates a second variation configuration of a textured layer (of random pitch) in an optical device according to an embodiment.
Figure 6C:
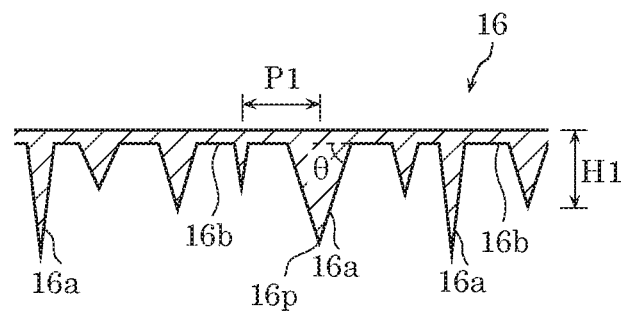
FIG. 6C illustrates a third variation configuration of a textured layer (of random angle) in an optical device according to an embodiment.
Figure 6D:
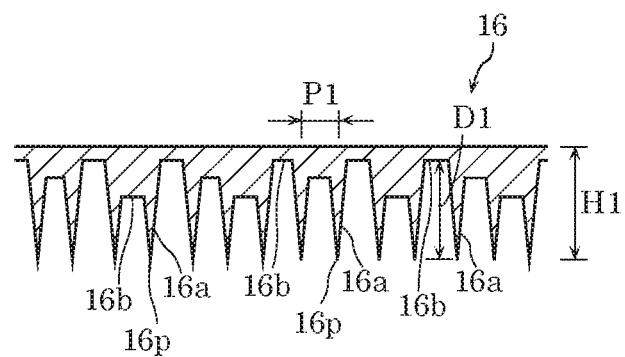
FIG. 6D illustrates a fourth variation configuration of a textured layer (of random depth) in an optical device according to an embodiment.

A preferred implementation of textured layer 16 in optical, device 1 will be described with reference to FIG. 6A to FIG. 6D. FIG. 6A to FIG. 6D illustrate variation configurations of textured layer 16 in optical device 1 according to the embodiment. FIG. 6A illustrates a first variation configuration of textured layer 16 (of random height), FIG. 6B illustrates a second variation configuration of textured layer 16 (of random pitch), FIG. 6C illustrates a third variation configuration of textured layer 16 (of random angle), and FIG. 6D illustrates a fourth variation configuration of textured layer 16 (of random depth). Note that FIG. 6A to FIG. 6D illustrate only the textured layer 16 section clipped out of optical device 1. Textured layer 16 illustrated in FIG. 6A to FIG. 6D can be applied to any of the implementations described above and below.

Textured layer 16 preferably includes irregular peaks and valleys. FIG. 6A to FIG. 6D illustrate textured layers 16 including irregular (random) peaks and valleys. Thus, the peaks and valleys of textured layer 16 are not regular. The irregular peaks and valleys can reduce interference, diffraction, and the like to inhibit light from becoming too intense in a specific direction, at a specific wavelength, or the like, and thus can improve the optical properties of optical device 1.

In FIG. 6A to FIG. 6D, a plurality of peaks 16a and a plurality of valleys 16b in textured layer 16 are schematically illustrated. The height of the peaks and valleys of textured layer 16 is denoted as "H1" in FIG. 6A to FIG. 6D. Height H1 of the peaks and valleys of textured layer 16 is defined as the length of a protruding portion (peak 16a) of textured layer 16 from a flat surface of textured layer 16 to the tip of the protruding portion. The peak-valley pitch of textured layer 16 is denoted as "P1" in FIG. 6A to FIG. 6D. Peak-valley pitch P1 of textured layer 16 is defined as the distance between adjacent peaks 16a in a direction parallel to the thickness direction thereof. The distance between adjacent peaks 16a is determined on the basis of the apexes of peaks 16a. Furthermore, in FIG. 6C, "θ" indicates the angle of the peaks and valleys of textured layer 16. Angle θ of the peaks and valleys of textured layer 16 is defined as an angle between a flat surface of textured layer 16 and a virtual straight line extending from the base to apex of peak 16a. Furthermore, in FIG. 6D, D1 indicates the depression depth of the peaks and valleys of textured layer 16. Depression depth D1 of textured layer 16 is defined as the length from the tip of peak 16a to the bottom of valley 16b in the thickness direction.

The irregular peaks and valleys of textured layer 16 are formed as a result of at least one of the following becoming irregular: height H1 of the peaks and valleys; peak-valley pitch P1; angle θ of the peaks and valleys; and depression depth D1 of the peaks and valleys.

FIG. 6A illustrates an example in which height H1 of the peaks and valleys is random. In other words, the plurality of peaks 16a are not equal in height. The plurality of peaks 16a have different heights H1. The positions of the tips of the plurality of peaks 16a are not the same in the thickness direction.

FIG. 6B illustrates an example in which peak-valley pitch P1 is random. In other words, the distances between the plurality of peaks 16a are not equal. The plurality of peaks 16a are provided at different pitches P1. The distances between adjacent peaks 16a among the plurality of peaks 16a are not uniform.

FIG. 6C illustrates an example in which angle θ of the peaks and valleys is random. In other words, angles θ of the plurality of peaks 16a are not equal. The plurality of peaks 16a have different angles θ. The plurality of peaks 16a include peak 16a that protrudes at an obtuse angle and peak 16a that protrudes at an acute angle.

FIG. 6D illustrates an example in which depression depth D1 of the peaks and valleys is random. In other words, depression depths D1 of the plurality of valleys 16b are not equal. The plurality of valleys 16b have different depths D1. The depression positions of the plurality of valleys 16b are not the same.

In FIG. 6A to FIG. 6D, there are irregularities in at least one selected from among height H1 of the peaks and valleys, pitch P1 of the peaks and valleys, angle θ of the peaks and valleys, and depth D1 of the peaks and valleys. Note that the irregularities are preferably restricted so that specific peaks 16a and valleys 16b do not include disproportionately many irregularities. The average value of each of height H1 of the peaks and valleys, pitch P1 of the peaks and valleys, angle θ of the peaks and valleys, and depth D1 of the peaks and valleys can be determined. Height H1 of the peaks and valleys, pitch P1 of the peaks and valleys, angle θ of the peaks and valleys, and depth D1 of the peaks and valleys are defined as random indexes. When textured layer 16 including irregular peaks and valleys is viewed as a whole, the frequencies of appearance of the random index of peaks 16a and valleys 16b are preferably distributed uniformly, normally or exponentially on the basis of the average value. With this, textured layer 16 is inhibited from providing too biased optical properties to optical device 1.

In FIG. 6A to FIG. 6D, textured layer 16 includes a plurality of peaks 16a that protrude toward refractive index adjustment layer 15. Peak 16a has tip 16p. Tips 16p of the plurality of peaks 16a preferably protrude to aligned positions. Specifically, the positions of tips 16p of the plurality of peaks 16a may be the same in the thickness direction. When tips 16p of the plurality of peaks 16a protrude to the aligned positions, the thickness of refractive index adjustment layer 15 is likely to be more uniform. For example, in the case where the thickness of refractive index adjustment layer 15 is defined by spacers 151 described above (see FIG. 4), positions at spacers 151 are likely to be the same in the thickness direction, and thus the thickness of refractive index adjustment layer 15 is stabilized. FIG. 6B and FIG. 6D illustrate an example in which tips 16p of the plurality of peaks 16a protrude to the positions that are the same in the thickness direction.

In FIG. 6D, the plurality of valleys 16b are the same in shape except depth D1 of the peaks and the valleys. In this case, when the plurality of peaks 16a and the plurality of valleys 16b are formed by imprinting, the same mold can be used for the plurality of peaks 16a or valleys 16b to produce the peaks and the valleys through adjustment of the mold. Thus, textured layer 16 can be easily formed.

Figure 7:
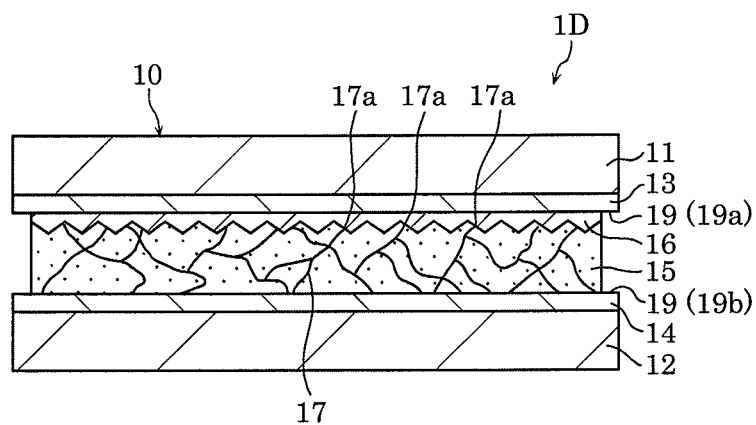
FIG. 7 is a cross-sectional view schematically illustrating an example of an optical device according to Variation 4 of an embodiment.

FIG. 7 is a cross-sectional view schematically illustrating an example of optical device 1D according to Variation 4 of the embodiment. Although an example of the direct peak-valley-forming structure is illustrated in FIG. 7, the description below can also be applied to the indirect peak-valley-forming structure (see FIG. 2).

In optical device 1D according to the present variation, refractive index adjustment layer 15 contains a macromolecular material. In the case where refractive index adjustment layer 15 contains a macromolecular material, the scattering of the material of refractive index adjustment layer 15, the material of the substrates, and the like can be limited even when optical device 1 is broken. This improves the safety. The macromolecular material can stabilize changes in the refractive index of refractive index adjustment layer 15. Thus, the light distribution properties are stabilized.

In FIG. 7, refractive index adjustment layer 15 has polymer structure 17 formed using a macromolecular material. Polymer structure 17 may be formed of a cross-linked structure of macromolecular chains. Polymer structure 17 may be formed of entangled macromolecules. Polymer structure 17 can have a mesh structure. As a result of providing liquid crystals between the meshes of polymer structure 17, it is possible to adjust the refractive index. The macromolecules can provide the light scattering properties to refractive index adjustment layer 15.

As the material of refractive index adjustment layer 15 that contains a macromolecular material, polymer dispersed liquid crystals are preferably used. Since liquid crystals are held by a macromolecular material in the polymer dispersed liquid crystals, stable refractive index adjustment layer 15 can be formed using the polymer dispersed liquid crystals. The polymer dispersed liquid crystals are called PDLC. Furthermore, polymer network liquid crystals may be used as the material of refractive index adjustment layer 15. The polymer network liquid crystals are called PNLC.

The polymer dispersed liquid crystals and the polymer network liquid crystals may include a resin portion and a liquid crystal portion. The resin portion is formed using the macromolecular material. The resin portion is preferably light-transmissive. With this, it is possible to form refractive index adjustment layer 15 having a variable refractive index. The resin portion can be formed using a thermosetting resin, an ultraviolet curable resin, or the like. The liquid crystal portion is a portion having a liquid crystal structure that changes by the electric field. As the liquid crystal portion, nematic liquid crystals or the like are used. The polymer dispersed liquid crystals and the polymer network liquid crystals preferably have a structure in which the resin portion is dotted with the liquid crystal portion. The polymer dispersed liquid crystals and the polymer network liquid crystals may have a sea-island structure in which the resin portion is the sea and the liquid crystal portion is the island. As a preferred shape of the polymer dispersed liquid crystals and the polymer network liquid crystals, the liquid crystal portion is connected in an irregular, mesh pattern in the resin portion. Naturally the polymer dispersed liquid crystals and the polymer network liquid crystals may be structured so that the liquid crystal portion is dotted with the resin portion or that the resin portion is connected in an irregular, mesh pattern in the liquid crystal portion, for example.

In the case where refractive index adjustment layer 15 contains a macromolecular material, refractive index adjustment layer 15 has increased retaining properties. The material of refractive index adjustment layer 15 is less likely to flow therein. This allows refractive index adjustment layer 15 with an adjusted refractive index to be highly maintained.

The macromolecular material can be used to form polymer structure 17 inside refractive index adjustment layer 15 as described above. As illustrated in FIG. 7, polymer structure 17 includes a plurality of reaching points 17a reaching the textured layer 16 side surface of refractive index adjustment layer 15. In this case, the average distance between the plurality of reaching points 17a is preferably greater than the average peak-valley pitch of textured layer 16. The plurality of reaching points 17a are points of contact with textured layer 16 in the example in FIG. 7. Although textured layer 16 can include the plurality of peaks and the plurality of valleys, if the macromolecular material enters valleys, there is a low chance of a substance (for example, a liquid crystal) other than the macromolecular material entering the valleys, which may result in a decrease in the effect of refractive index adjustment in refractive index adjustment layer 15. In this regard, when the average distance between the plurality of reaching points 17a is greater than the average peak-valley pitch of textured layer 16, there is a low chance of the macromolecular material entering the valleys, and thus refractive index adjustment layer 15 is more likely to produce the effect of refractive index adjustment. In particular, liquid crystals allow easy control of the refractive index; the presence of liquid crystals near textured layer 16 is advantageous for the light distribution properties. Therefore, when the average distance between the plurality of reaching points 17a is greater than the average peak-valley pitch of textured layer 16, the effect of light distribution by optical device 1 improves.

The average distance between the plurality of reaching points 17a and the average peak-valley pitch of textured layer 16 can be measured through the analysis of a cross-section of optical device 1D. A cross-section of optical device 1D obtained when cut in the thickness direction can be observed. At this time, for example, liquid crystals are washed off from refractive index adjustment layer 15 containing the liquid crystals and macromolecules, and mesh polymer structure 17 formed of the macromolecules can be observed. Reaching points 17a are also observed at this time. The distance between two adjacent reaching points 17a among the plurality of reaching points 17a is then measured; this distance measurement is performed on each of the plurality of reaching points 17a, and the average of measured distances is determined. The average of distance determined in this way is used as the average distance between the plurality of reaching points 17a. The shapes of the peaks and valleys of textured layer 16 including the plurality of peaks can also be observed at the cross-section just described. In addition, the distance between the positions of the tips of two adjacent peaks among the plurality of peaks is measured; this distance measurement is performed on each of the plurality of peaks, and the average of measured distances is determined. The average of distance determined in this way is used as the average distance between the plurality of peaks, that is, the average peak-valley pitch of textured layer 16. Note that the average peak-valley pitch of textured layer 16 may be determined using the plurality of valleys.

The macromolecules in refractive index adjustment layer 15 preferably increase in number in a direction away from textured layer 16. In this case, the amount of the macromolecular material is small near textured layer 16, and thus there is a low chance of the macromolecular material entering the valleys of textured layer 16. When there is a low chance of the macromolecular material entering the valleys, refractive index adjustment layer 15 is more likely to produce the effect of refractive index adjustment. A gradual increase in the content of the macromolecular material in refractive index adjustment layer 15 from first electrode 13 toward second electrode 14 is preferred. The content of the macromolecular material may increase in a continuous manner or may increase in a stepwise manner. When the content of the macromolecular material changes in a continuous manner, the change in the concentration of macromolecules in refractive index adjustment layer 15 can be gradational. The macromolecular material can form dense polymer structure 17 near second electrode 14 and sparse polymer structure 17 near textured layer 16. The gradual increase in the content of the macromolecular material is defined as a macromolecular content gradation. In optical device 1 including refractive index adjustment layer 15 having a macromolecular content gradation, polymer structure 17 gradually becomes dense from the vicinity of textured layer 16 toward the vicinity of second electrode 14 in FIG. 7.

The macromolecular content gradation can be formed by adjusting ultraviolet irradiation (light irradiation) for curing an ultraviolet curable resin (also referred to as a photopolymerizable resin). In this case, refractive index adjustment layer 15 contains an ultraviolet curable resin. The content of the macromolecular material can be high in a portion that is cured fast by ultraviolet light. Among the methods of ultraviolet irradiation for forming the macromolecular content gradation, the first method is setting a long optical path length by causing ultraviolet light to enter at an angle so that the ultraviolet light is less likely to reach a portion. The second method is first emitting low-energy ultraviolet light to collect the liquid crystals in the vicinity of textured layer 16 and thereafter emitting high-energy ultraviolet light to cure the resin. The third method is emitting ultraviolet light in both directions from the first electrode 13 side and the second electrode 14 side to cure the resin. The fourth method is first emitting low-energy ultraviolet light to collect the liquid crystals in the vicinity of textured layer 16 and thereafter emitting high-energy ultraviolet light in the both directions from the first electrode 13 side and the second electrode 14 side to cure the resin. The fifth method is emitting, from the side of refractive index adjustment layer 15, ultraviolet light in a direction in which refractive index adjustment layer 15 expands (a planer direction, that is, a direction parallel to the surface of first substrate 11) and generating an evanescent wave so that a portion of refractive index adjustment layer 15 is strongly irradiated with the ultraviolet light. The sixth method is preparing textured layer 16 having a textured structure in which ultraviolet light is easily reflected or refracted, emitting ultraviolet light so that the ultraviolet light passes through textured layer 16, and curing a portion of refractive index adjustment layer 15 with reflected or refracted light of the ultraviolet light. The seventh method is heating up to a temperature at which phase separation of the macromolecular material and the liquid crystals occur and then emitting ultraviolet light. Note that the above methods are effective not only in forming the macromolecular content gradation, but also in forming refractive index adjustment layer 15 including macromolecule-containing portion 15A and non-macromolecule-containing portion 15B to be described next. Refractive index adjustment layer 15 may include a spacer. In order to prevent peeling off of first electrode 13 and peeling off of second electrode 14, an adhesive portion may be provided on the periphery of refractive index adjustment layer 15.

Figure 8:
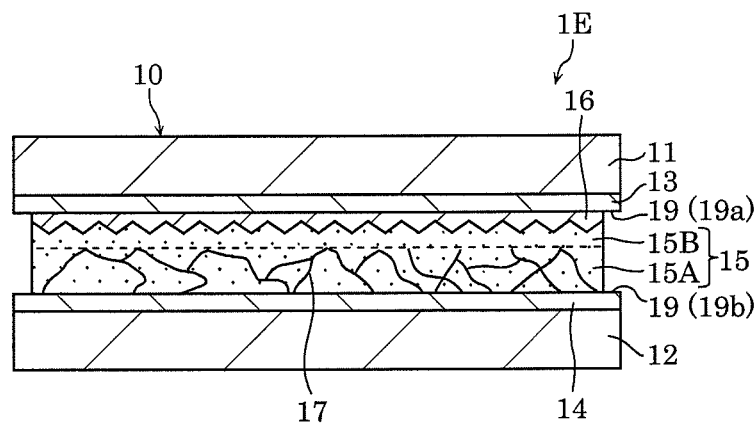
FIG. 8 is a cross-sectional view schematically illustrating an example of an optical device according to Variation 5 of an embodiment.

FIG. 8 is a cross-sectional view schematically illustrating an example of optical device 1E according to Variation 5 of the embodiment. Although an example of the direct peak-valley-forming structure is illustrated in FIG. 8, the description below can also be applied to the indirect peak-valley-forming structure (see FIG. 2).

In optical device 1E illustrated in FIG. 8, refractive index adjustment layer 15 contains a macromolecular material as in optical device 1D illustrated in FIG. 7. As a result of refractive index adjustment layer 15 containing a macromolecular material, the safety and the orientation are improved. Refractive index adjustment layer 15 has polymer structure 17 formed using a macromolecular material.

In optical device 1E illustrated in FIG. 8, unlike optical device 1D illustrated in FIG. 7, refractive index adjustment layer 15 includes non-macromolecule-containing portion 15B containing no macromolecular material and macromolecule-containing portion 15A containing a macromolecular material. Non-macromolecule-containing portion 15B is formed closer to textured layer 16 than macromolecule-containing portion 15A is. There is no macromolecular material in non-macromolecule-containing portion 15B. Meanwhile, there is a macromolecular material in macromolecule-containing portion 15A. The macromolecular material is disproportionately present on the second electrode 14 side in refractive index adjustment layer 15. The macromolecular material is not in contact with textured layer 16. There is no macromolecular material in the vicinity of textured layer 16. Non-macromolecule-containing portion 15B can prevent the macromolecular material from coming into contact with textured layer 16. Thus, there is a low chance of the macromolecular material from entering the valleys of textured layer 16. When there is a low chance of the macromolecular material entering the valleys, refractive index adjustment layer 15 is more likely to produce the effect of refractive index adjustment. Refractive index adjustment layer 15 can contain a macromolecular material and liquid crystals. For example, macromolecule-containing portion 15A may be a portion that contains a macromolecular material and liquid crystals. Non-macromolecule-containing portion 15B may be a portion that does not contain a macromolecular material, but contains liquid crystals. Due to the presence of non-macromolecule-containing portion 15B, the valleys of textured layer 16 are likely to be filled with the liquid crystals.

In refractive index adjustment layer 15 in FIG. 8, the content of the macromolecular material increases in a direction away from textured layer 16. The content of the macromolecular material is changed in at least two stages.

In FIG. 8, the boundary between macromolecule-containing portion 15A and non-macromolecule-containing portion 15B is indicated by a dashed line. In refractive index adjustment layer 15, non-macromolecule-containing portion 15B is positioned on the side close to textured layer 16, and macromolecule-containing portion 15A is positioned on the side far from textured layer 16. Non-macromolecule-containing portion 15B and textured layer 16 are in contact with each other. Meanwhile, macromolecule-containing portion 15A and textured layer 16 are not in contact with each other. Non-macromolecule-containing portion 15B has a textured surface. Macromolecule-containing portion 15A can be in the form of a layer. Non-macromolecule-containing portion 15B can also be in the form of a layer. The boundary between macromolecule-containing portion 15A and non-macromolecule-containing portion 15B may be clear or may be unclear.

The substances in macromolecule-containing portion 15A other than the macromolecular material can be substances that are contained in non-macromolecule-containing portion 15B. Macromolecule-containing portion 15A is preferably formed using the macromolecular material in addition to the material of non-macromolecule-containing portion 15B. Refractive index adjustment layer 15 can be easily formed by using the same material for macromolecule-containing portion 15A and non-macromolecule-containing portion 15B except the macromolecular material. The substances may move back and forth between macromolecule-containing portion 15A and non-macromolecule-containing portion 15B. For example, the liquid crystals in macromolecule-containing portion 15A and the liquid crystals in non-macromolecule-containing portion 15B may be mixed.

The macromolecular material used for refractive index adjustment layer 15 can provide the scattering properties. In optical device 1E in FIG. 8, macromolecule-containing portion 15A can provide the light scattering properties. The level of the scattering properties can be changed according to the value of applied voltage (the amount of flowing electric current). Macromolecule-containing portion 15A can function as a light scattering layer.

Non-macromolecule-containing portion 15B can be formed with such a thickness that macromolecule-containing portion 15A does not come into contact with textured layer 16. The thickness of non-macromolecule-containing portion 15B may be 400 nm or more, for example. When the thickness of non-macromolecule-containing portion 15B is greater than or equal to the wavelength of visible light, the effect of refractive index adjustment improves. Note that the thickness of non-macromolecule-containing portion 15B is defined as the distance between the tips of the peaks of textured layer 16 to the interface between macromolecule-containing portion 15A and non-macromolecule-containing portion 15B.

Refractive index adjustment layer 15 such as that in FIG. 8 may be formed by sequentially stacking the material of non-macromolecule-containing portion 15B and the material of macromolecule-containing portion 15A or may be formed by stacking the material of refractive index adjustment layer 15 containing a macromolecular material on textured layer 16 or second electrode 14 and disproportionately positioning the macromolecular material on the second electrode 14 side. In this case, as a result of the disproportionate presence of the macromolecular material, macromolecule-containing portion 15A and non-macromolecule-containing portion 15B are formed as separate portions.

Figure 9A:
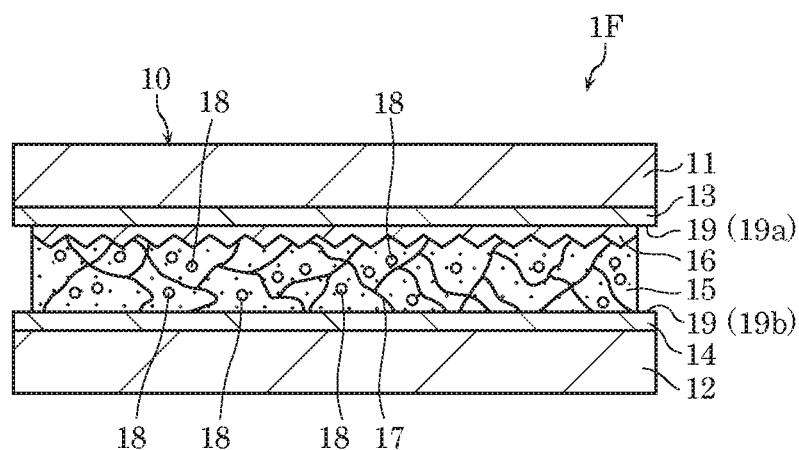
FIG. 9A schematically illustrates an example of an optical device (without reflective properties) according to Variation 6 of an embodiment.
Figure 9B:
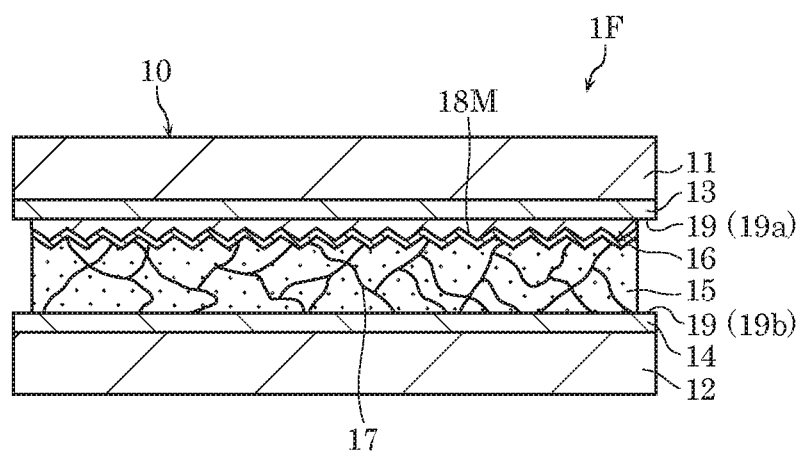
FIG. 9B schematically illustrates an example of an optical device (with reflective properties) according to Variation 6 of an embodiment.

FIG. 9A and FIG. 9B schematically illustrate examples of optical device 1F according to Variation 6 of the embodiment. Although examples of the direct peak-valley-forming structure are illustrated in FIG. 9A and FIG. 9B, the description below can also be applied to the indirect peak-valley-forming structure (see FIG. 2).

In FIG. 9A and FIG. 9B, refractive index adjustment layer 15 is variable to the state of being opaque in the visible light range. The wording "opaque" means the state of not allowing the passage of light or the state of allowing the passage of the least amount of light. The state of being opaque is defined as an opaque state. FIG. 9A and FIG. 9B illustrate examples of refractive index adjustment layer 15 providing the opaque state. In FIG. 9A and FIG. 9B, the opaque state depends on the reflection state. Note that FIG. 9A illustrates the state without reflective properties and FIG. 9B illustrates the state with reflective properties.

In FIG. 9A, refractive index adjustment layer 15 contains reflective film ingredient 18. In FIG. 9A, reflective film ingredient 18 is schematically illustrated. Examples of reflective film ingredient 18 include metal ions. Examples of the metal ions include Ag ions, Al ions, Au ions, Cu ions, and Cr ions. These ions can be blended together with counterions that form pairs therewith. For example, Ag can be blended with refractive index adjustment layer 15 as silver nitrate. Reflective film ingredient 18 may be metal particles. Reflective film ingredient 18 is dissolved or dispersed in refractive index adjustment layer 15. Refractive index adjustment layer 15 has polymer structure 17. Reflective film ingredient 18 is present in gaps in polymer structure 17. The reflective state does not need to be created with reflective film ingredient 18 alone. Therefore, optical device 1F is transparent in FIG. 9A.

In FIG. 9B, optical device 1F includes reflective film 18M. Reflective film 18M is provided between first electrode 13 and refractive index adjustment layer 15. Reflective film 18M extends along the textured interface. Reflective film 18M has peaks and valleys. As a result of deposition of reflective film ingredient 18 illustrated in FIG. 9A on a surface of an electrode, reflective film 18M can be formed. For example, when a voltage is applied between first electrode 13 and second electrode 14, the metal ions can be deposited on an electrode surface according to the same sort of principle as the electrodeposition principle. Reflective film 18M formed in this way does not allow the passage of light, but reflects light. Thus, optical device 1 changes to the state of being opaque. When a reverse voltage is applied in the state illustrated in FIG. 9B compared with the case of forming reflective film 18M, reflective film 18M is dissolved or dispersed in refractive index adjustment layer 15. Thus, the state without reflective properties in FIG. 9A returns. In this way, optical device 1F can reversibly change between the state of being transparent and the state of being opaque. When reflective film 18M is formed, optical device 1F no longer allows the passage of light. Thus, heat-shielding properties can be exhibited.

Reflective film 18M has a function of reflecting light. It is possible to improve the optical properties by forming reflective film 18M. Reflective film 18M can be easily formed by metal deposition. In the case where reflective film 18M including peaks and valleys is formed, too strong reflection of light in one direction can be reduced. Therefore, reflective film 18M is preferably formed along the textured interface. With this, light is diffusely reflected, and thus light pollution can be reduced. However, in the case where it is desired to form a mirror structure, reflective film 18M may be formed on a flat surface of refractive index adjustment layer 15. Note that instead of reflective film 18M, an opaque film having no reflective properties may be formed. In this case, reflective film ingredient 18 can be replaced by an opaque film ingredient.

By adjusting the refractive index in the state (without reflective properties) illustrated in FIG. 9A, optical device 1F is variable between the transparent state, the light distribution state, and the scattered state. Furthermore, the refractive index can be adjusted in the state (with reflective properties) illustrated in FIG. 9B so that the optical state of refractive index adjustment layer 15 is changed. Changes in the transparency and the reflective properties can be controlled independently of the light distribution properties, the scattering properties, and the like. For example, refractive index adjustment layer 15 having light distribution properties and scattering properties that change according to the alternate current is used. In this case, the alternate current is periodically provided. A direct current is used to apply a direct-current voltage in a period that is generally longer than the period of the alternate current, to cause a change from reflective film ingredient 18 into reflective film 18M and vice versa. The change between reflective film ingredient 18 and reflective film 18M cannot follow the periodic change of the alternate-current voltage and hardly occurs depending on the alternate-current voltage. Therefore, when an alternate-current voltage is applied after the state illustrated in FIG. 9A is changed into the state illustrated in FIG. 9B through application of a direct-current voltage, it is possible to change the optical state of refractive index adjustment layer 15 by adjusting the refractive index in the state illustrated in FIG. 9B. When an alternate-current voltage is applied after the state illustrated in FIG. 9B is changed into the state illustrated in FIG. 9A through application of a direct-current voltage, it is possible to change the optical device between the transparent state, the light distribution state, and the scattered state by adjusting the refractive index in the state illustrated in FIG. 9A.

Figure 10:
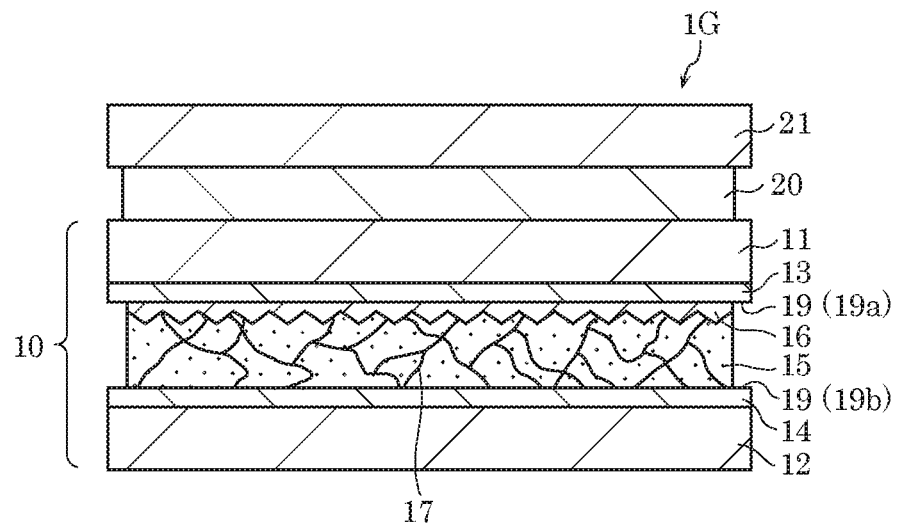
FIG. 10 is a cross-sectional view schematically illustrating an example of an optical device according to Variation 7 of an embodiment.

FIG. 10 schematically illustrates an example of optical device 1G according to Variation 7 of the embodiment. Although an example of the direct peak-valley-forming structure is illustrated in FIG. 10, the description below can also be applied to the indirect peak-valley-forming structure (see FIG. 2).

In FIG. 10, optical device 1G includes transparency variable portion 20 that is variable between the state of being transparent and the state of being opaque. First electrode 13 is provided between transparency variable portion 20 and refractive index adjustment layer 15. With transparency variable portion 20, the optical device can be easily changed between the transparent state and the opaque state and have improved optical properties. Transparency variable portion 20 is formed of a layer having variable transparency. Transparency variable portion 20 is provided between the pair of substrates.

Specifically third substrate 21 is provided outside first substrate 11, and transparency variable portion 20 is provided between first substrate 11 and third substrate 21. Third substrate 21 can be formed using the same material as the material of first substrate 11. Third substrate 21 is opposite to first substrate 11. Transparency variable portion 20 is supported by first substrate 11 and third substrate 21. A stacked body including first substrate 11, transparency variable portion 20, and third substrate 21 is defined as a transparency variable body. Although the transparency variable body and optical adjuster 10 share a substrate (first substrate 11) in the present variation, a structure in which the transparency variable body and optical adjuster 10 do not share the substrate may be used.

Instead of creating the opaque state using a component in refractive index adjustment layer 15 such as that in FIG. 9A and FIG. 9B, optical device 1G illustrated in FIG. 10 includes, separately from optical adjuster 10, a portion that can become opaque. Thus, there is the advantage of facilitating designing of the optical device.

The transparency of transparency variable portion 20 preferably changes by the electric field. The change in transparency between the transparent state and the opaque state may be in two stages, but more preferably is a gradual change from the transparent state to the opaque state. With this, it is possible to improve the optical properties. The gradual change from the transparent state to the opaque state may be stepwise or may be continuous. The transparency can be changed according to the intensity of the electric field.

Examples of transparency variable portion 20 include a structure in which a layer having variable transparency is provided between a pair of electrodes. With this, the transparency can be easily changed. The layer having variable transparency is defined as a transparency variable layer. The electrodes of transparency variable portion 20 can be formed using the same materials as the materials of first electrode 13 and second electrode 14 described above. In order to independently drive transparency variable portion 20, the electrodes of transparency variable portion 20 may be electrically insulated from first electrode 13 and second electrode 14.

The change of transparency variable portion 20 to the opaque state may be caused by an increase in the light reflective properties or may be caused by an increase in the light absorption properties. When transparency variable portion 20 becomes opaque, the heat-shielding properties improve. From the standpoint of improving the heat-shielding properties, the increase in the light reflective properties is preferred. Transparency variable portion 20 preferably have memory properties in the case of electric field or current modulation. With this, it is possible to improve the power efficiency.

Examples of the material having variable light reflective properties include nematic liquid crystals, cholesteric liquid crystals, ferroelectric liquid crystals, and an electrochromic material. The cholesteric liquid crystals are nematic liquid crystals with a helical structure, for example. The cholesteric liquid crystals are chiral nematic liquid crystals, for example. In the cholesteric liquid crystals, the orientation direction of the molecular axis changes in a continuous manner in a space, and thus a macroscopic helical structure is generated. Therefore, the reflection of light corresponding to the period of the helix is possible. With the electrochromic material, the color change phenomenon of substances which occurs due to electrochemical reversible reaction (electrochemical redox reaction) through the application of a voltage can be used, and thus the control, between the light reflective properties and the light-transmitting properties is possible. Examples of the material having variable light adsorption properties include liquid crystals containing tungsten oxide, a dichroism pigment, and the like.

In FIG. 10, transparency variable portion 20 is provided on first substrate 11. Transparency variable portion 20 may be provided on second substrate 12. Note that in order to efficiently reduce the entry of outside light, transparency variable portion 20 is preferably provided outside first substrate 11.

Figure 11:
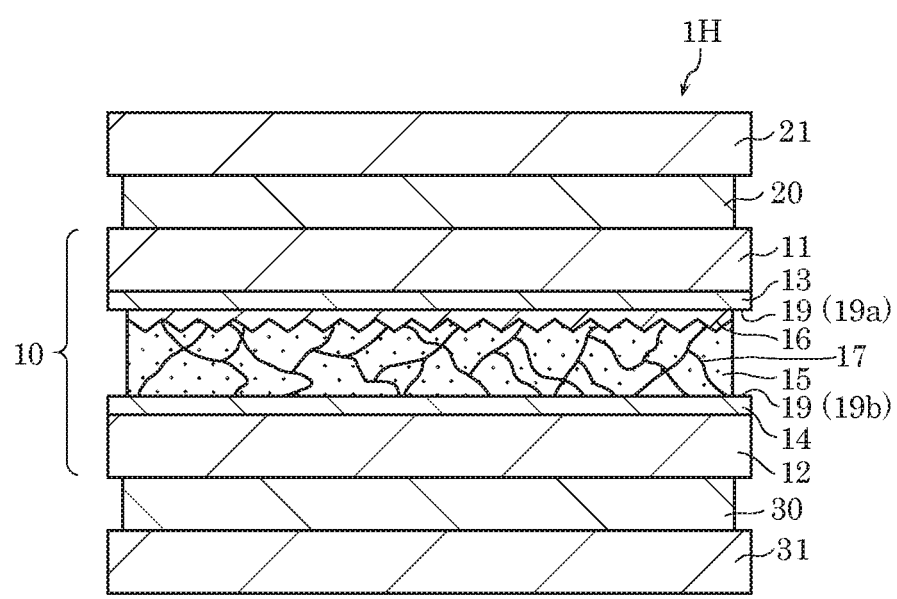
FIG. 11 is a cross-sectional view schematically illustrating an example of an optical device according to Variation 8 of an embodiment.

FIG. 11 schematically illustrates an example of optical device 1H according to Variation 8 of the embodiment. Although an example of the direct peak-valley-forming structure is illustrated in FIG. 11, the description below can also be applied to the indirect peak-valley-forming structure (see FIG. 2).

In FIG. 11, optical device 1H further includes light emitter 30. Light emitter 30 emits light using power supplied thereto. With light emitter 30, optical device 1H can emit light. Thus, it is possible to improve the optical properties. The light emission of optical device 1H is applicable in lighting, backlights, signage, and the like.

In optical device 1H illustrated in FIG. 11, light emitter 30 is in the form of a layer. A planar, transparent light emitter can be used as light emitter 30. Light emitter 30 can be formed using a light-emitting diode (LED), an organic electroluminescent element (OLED: organic light-emitting diode), or the like. The use of the organic electroluminescent element facilitates planar light emission. With an inorganic light-emitting diode, planar light emission can be obtained usually by the use of a light guide plate. Light emitter 30 may include a pair of electrodes and a light-emitting layer that emits light using power supplied from the electrodes. Light emitter 30 is light-transmissive. Light emitter 30 is provided between the pair of substrates. Additional substrate 31 is provided outside second substrate 12. Additional substrate 31 is an added substrate. Light emitter 30 is provided between second substrate 12 and additional substrate 31. Additional substrate 31 can be formed using the same material as the material of second substrate 12. Additional substrate 31 is opposite to second substrate 12. Light emitter 30 is supported by second substrate 12 and additional substrate 31. A stacked body including second substrate 12, light emitter 30, and additional substrate 31 is defined as a light-emitting element. Although the light-emitting element and optical adjuster 10 share a substrate (second substrate 12) in the present variation, a structure in which the light-emitting element and optical adjuster 10 do not share the substrate may be used.

Light emitter 30 can turn ON and OFF independently of optical adjuster 10. Therefore, it is possible to create various optical states, and thus the optical properties improve.

In FIG. 11, optical device 1H includes transparency variable portion 20. In optical device 1H including light emitter 30, transparency variable portion 20 is preferably variable between the reflection state and the transparent state. When transparency variable portion 20 is in the reflection state, light emitted from light emitter 30 can be reflected, and thus an increased amount of light can be emitted. The light is output from additional substrate 31.

In FIG. 11, light emitter 30 is provided on second substrate 12. Light emitter 30 may be provided on third substrate 21. Light emitter 30 may be provided between transparency variable portion 20 and optical adjuster 10. In order to emit light outside on the second substrate 12 side, however, it is preferred that light emitter 30 be provided outside second substrate 12.

Note that optical device 1H according to the present variation, illustrated in FIG. 11, is an optical device obtained by adding light emitter 30 to optical device 1G including transparency variable portion 20, illustrated in FIG. 10, but optical device 1H is not required to include transparency variable portion 20.

Figure 12:
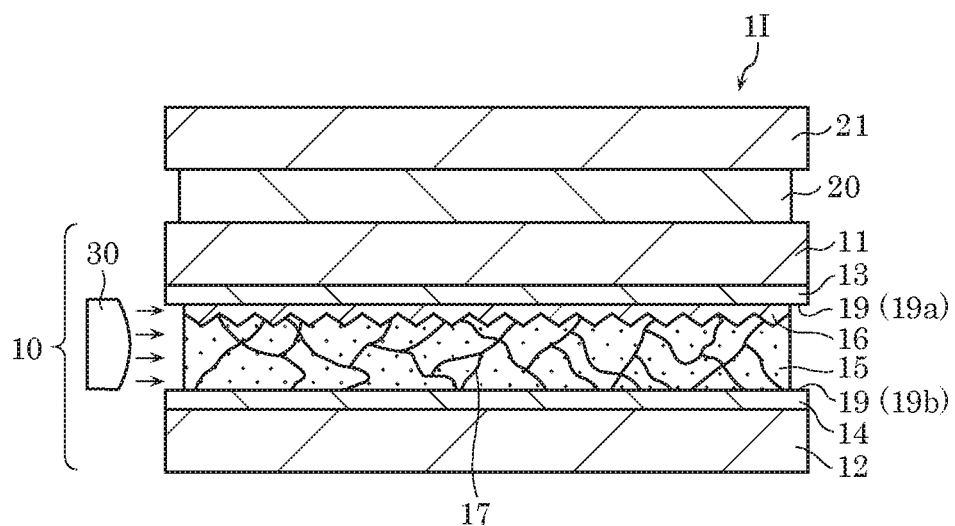
FIG. 12 is a cross-sectional view schematically illustrating an example of an optical device according to Variation 9 of an embodiment.

FIG. 12 schematically illustrates an example of optical device 1I according to Variation 9 of the embodiment. Although an example of the direct peak-valley-forming structure is illustrated in FIG. 12, the description below can also be applied to the indirect peak-valley-forming structure (see FIG. 2).

In FIG. 12, optical device 1H1 includes light emitter 30. Light emitted from light emitter 30 is guided through refractive index adjustment layer 15. Light emitter 30 emits light using power supplied thereto. In this way with a configuration in which light is guided through refractive index adjustment layer 15, light can be efficiently emitted. With light emitter 30, optical device 1I can emit light. Thus, it is possible to improve the optical properties. The light emission of optical device 1I is applicable in lighting, backlights, signage, and the like. Note that in FIG. 12, light emitted from light emitter 30 is indicated by arrows.

Light emitter 30 can be configured using a light-emitting diode (LED) or the like. A plurality of light emitters 30 may be provided. Light emitters 30 may emit light in the form of dots or may emit light in the form of a line. Light emitted from light emitter 30 enters refractive index adjustment layer 15 from the side. Light emitter 30 may be provided on the side of refractive index adjustment layer 15. Refractive index adjustment layer 15 has the same function as what is called a light guide plate. Light emitted from light emitter 30 spreads in a planar pattern within refractive index adjustment layer 15. Planar light is emitted from optical device 1I mainly through second substrate 12. Light emitter 30 may be capable of turning ON and OFF independently. When refractive index adjustment layer 15 contains a macromolecular material, there is a possibility that light is scattered and easily guided or that the glare of light is reduced. Light emission is easily feasible using an LED) as light emitter 30.

Refractive index adjustment layer 15 may be in the scattered state when light emitter 30 emits light. By being placed in the scattered state, refractive index adjustment layer 15 has improved light-guiding properties. Furthermore, scattered light can be emitted, meaning that light can be uniformly emitted. Transparency variable portion 20 is not required to be provided, but it is preferred that transparency variable portion 20 be provided. When transparency variable portion 20 is provided, it is possible to improve the heat-shielding properties. Furthermore, transparency variable portion 20 can preferably change to the reflection state. When transparency variable portion 20 is in the reflection state, light emitted from light emitter 30 can be output from optical device 1I by being reflected, and thus it is possible to improve light-emitting efficiency.

Figure 13:
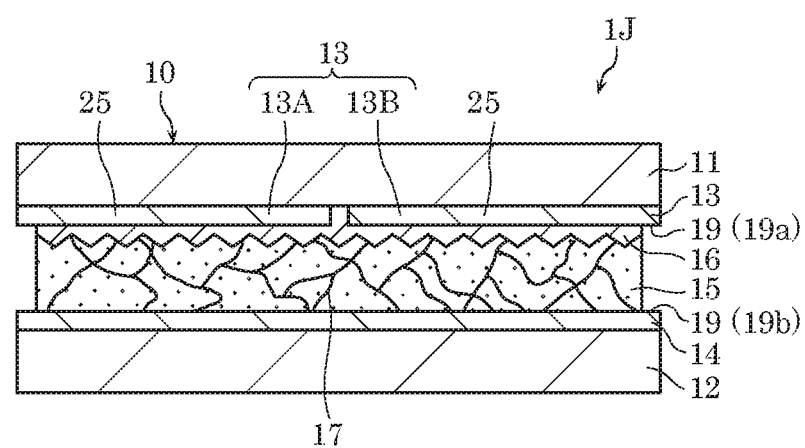
FIG. 13 is a cross-sectional view schematically illustrating an example of an optical device according to Variation 10 of an embodiment.

FIG. 13 schematically illustrates an example of optical device 1J according to Variation 10 of the embodiment. Although an example of the direct peak-valley-forming structure is illustrated in FIG. 13, the description below can also be applied to the indirect peak-valley-forming structure (see FIG. 2). Optical device 1J illustrated in FIG. 13 is a variation based on optical device 1D illustrated in FIG. 7, but the description below can also be applied to variations based on other examples. For example, the description below can also be applied to an implementation in which refractive index adjustment layer 15 does not contain the macromolecular material.

In optical device 1J, at least one of first electrode 13 and second electrode 14 is split into a plurality of portions. When first electrode 13 or second electrode 14 is split in this way, the electric field can be partially applied, and thus it is possible to create different optical states within the plane. For example, it is possible to provide the following two portions; a portion having high transparency; and a portion having high light distribution properties, or to provide the following two portions: a transparent portion; and an opaque portion. With this, the optical properties improve. Furthermore, when first electrode 13 or second electrode 14 is split, two or more areas in different optical states can be formed in optical device 1J.

FIG. 13 illustrates an example in which first electrode 13 is split into a plurality of portions. First electrode 13 may be split in any appropriate pattern within a substrate plane. For example, first electrode 13 can be split into two portions, which are first portion 13A and second portion 13B in FIG. 13. In the case where optical device 1J is used as a window, the window can be split into two portions, an upper portion and a lower portion, in such a manner that the upper portion allows the passage of light and the lower portion does not allow the passage of light. With this, it is possible to make the space where a person is present dark while making the room bright. Note that first electrode 13 may be split into three or more portions. The number of areas with different optical states can increase with an increase in the number of portions into which first electrode 13 is split. In order to facilitate manufacture, however, the number of portions into which the electrode is split is preferably small and may be, for example, eight or less. The areas with different optical states can be checked by a user when seen in plan view.

Each portion obtained by splitting first electrode 13 is defined as split electrode portion 25. At least one of first electrode 13 and second electrode 14 can include a plurality of split electrode portions 25. The plurality of split electrode portions 25 are formed by splitting first electrode 13 or second electrode 14. The plurality of split electrode portions 25 can be preferably supplied with power at different levels. In FIG. 13, each of first portion 13A and second portion 13B of first electrode 13 is split electrode portion 25. In this case, first portion 13A and second portion 13B can be supplied with power at different levels. Thus, it is possible to change the refractive index, the scattering properties, etc., within the plane, meaning that there is an in-plane distribution of optical properties. Accordingly the controllable range of the refractive index, the scattering properties, etc., is expanded, and the controllable range of the angle of incident light can be expanded as well. In this way the supply of power at different levels within the plane can result in optical device 1J having good optical properties.

Note that although the case where first electrode 13 is split into a plurality of portions is described with reference to FIG. 13, the same will apply to the case where second electrode 14 is split into a plurality of portions. Second electrode 14 alone may be split, or both of first electrode 13 and second electrode 14 may be split. In the case where both of first electrode 13 and second electrode 14 are split, they may be split in the same pattern. This improves the power efficiency.

Figure 14:
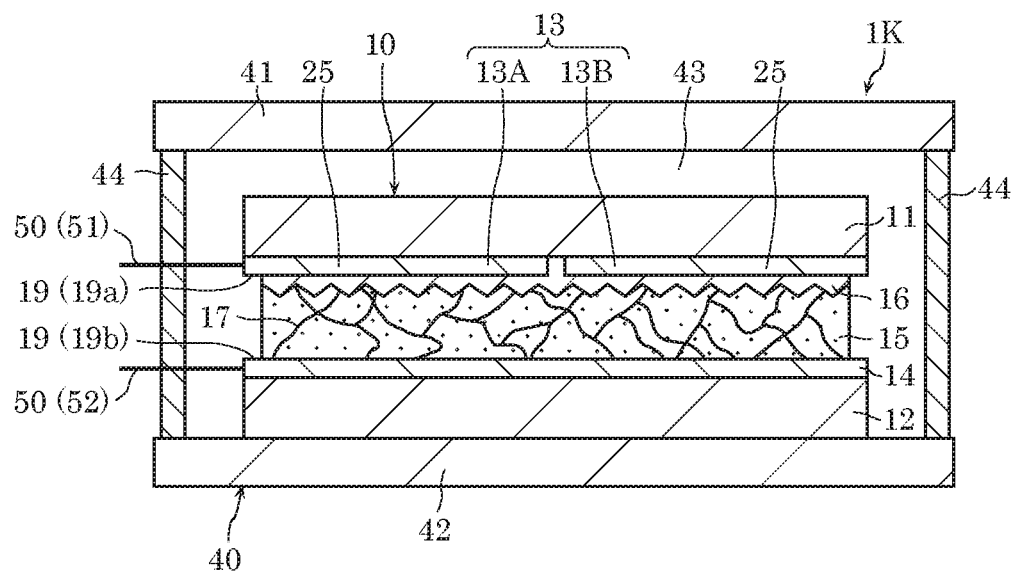
FIG. 14 is a cross-sectional view schematically illustrating an example of an optical device according to Variation 11 of an embodiment.

FIG. 14 schematically illustrates an example of optical device 1K according to Variation 11 of the embodiment, Although an example of the direct peak-valley-forming structure is illustrated in FIG. 14, the description below can also be applied to the indirect peak-valley-forming structure (see FIG. 2). Optical device 1K illustrated in FIG. 14 is a variation based on optical device 1J illustrated in FIG. 13, but the description below can also be applied to variations based on other examples.

In FIG. 14, optical device 1K further includes first glass panel 41 and second glass panel 42. Sealed space 43 is provided between first glass panel 41 and second glass panel 42. Optical adjuster 10 including first electrode 13, refractive index adjustment layer 15, and second electrode 14 is provided in sealed space 43. First glass panel 41, second glass panel 42, and sealed space 48 constitute glass panel unit 40. Glass panel unit 40 functions as what is called double glazing. Optical adjuster 10 is present inside glass panel unit 40 (double glazing). Optical device 1K includes glass panel unit 40. Optical device 1K is configured of glass panel unit 40 incorporating optical adjuster 10. When glass panel unit 40 is used for optical device 1 as just described, it is possible to improve the thermal insulation properties. Therefore, it is possible to obtain optical device 1K that is effective as a building material (including a window). Furthermore, glass panel unit 40 can protect optical device 1K, and thus it is possible to improve mechanical strength. Consequently, it is possible to optical device 1K that is not prone to breakage.

Sealed space 43 may be vacuum or may be filled with a gas. In order to make optical adjuster 10 more resistant to degradation, sealed space 43 is preferably vacuum or filled with inert gas. Furthermore, from the standpoint of improving the thermal insulation properties, sealed space 43 is preferably vacuum or filled with inert gas. Examples of the gas include Ar gas, nitrogen gas, and dry air, but the gas is not limited to these examples. Sealed space 43 is preferably sealed and insulated from outside.

In FIG. 14, sealing wall 44 is provided between first glass panel 41 and second glass panel 42. Sealing wall 44 is a portion of glass panel unit 40. Sealing wall 44 is provided on the edges of first glass panel 41 and second glass panel 42. Sealing wall 44 bonds first glass panel 41 and second glass panel 42 together. Sealing wall 44 may surround sealed space 43. Sealing wall 44 seals first glass panel 41 and second glass panel 42 and defines sealed space 43. Sealing wall 44 can be formed using glass, metal such as aluminum, resin, or the like. Sealing wall 44 defines a distance between first glass panel 41 and second glass panel 42. The thickness (height) of sealing wall 44 may be greater than the thickness of optical adjuster 10. With this, optical adjuster 10 can be easily housed in sealed space 43.

Sealing wall 44 preferably includes a spacer. By including the spacer in sealing wall 44, it is possible to easily provide a sufficient distance between first glass panel 41 and second glass panel 42. The spacer is an inorganic material, for example. The spacer may be a particle or may be a wire rod. The use of the spacer improves the sealing properties.

In FIG. 14, line 50 for supplying power to drive optical device 1K is illustrated. Line 50 includes first line 51 electrically connected to first electrode 13 and second line 52 electrically connected to second electrode 14. When power is supplied through line 50, the optical state of optical device 1K can be changed. In the case where a portion that is driven with power such as transparency variable portion 20 or light emitter 30 is further included as described above, a line corresponding to the portion may be added. It will be appreciated that line 50 may be provided in an implementation other than in FIG. 14.

Figure 15:
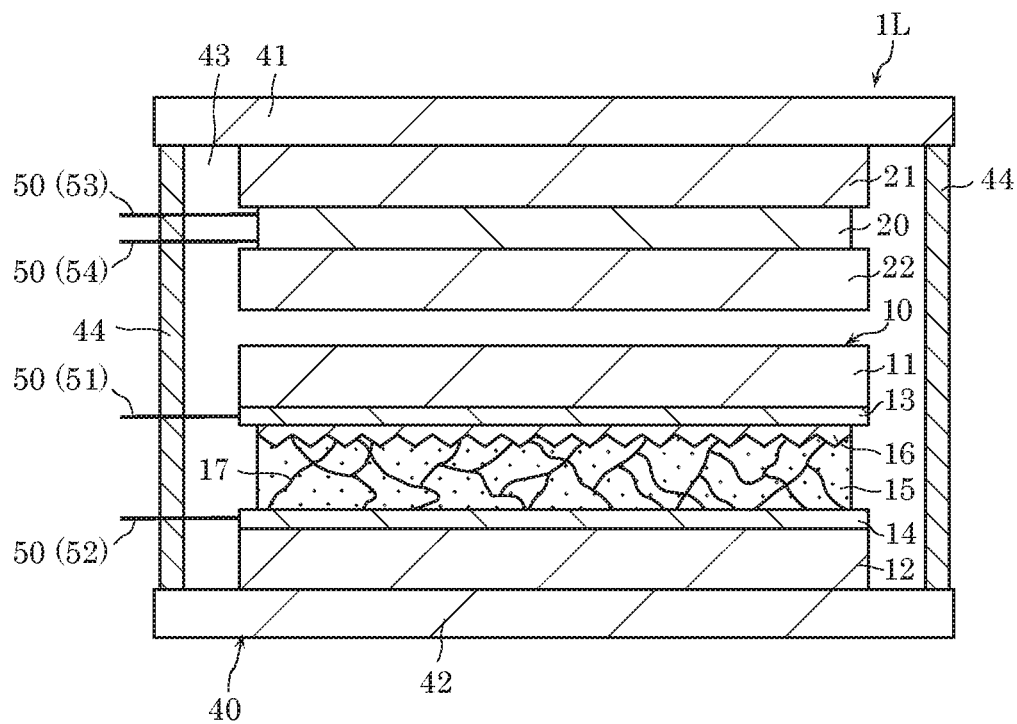
FIG. 15 is a cross-sectional view schematically illustrating an example of an optical device according to Variation 12 of an embodiment.

FIG. 15 schematically illustrates an example of optical device 1L according to Variation 12 of the embodiment. Although an example of the direct peak-valley-forming structure is illustrated in FIG. 15, the description below can also be applied to the indirect peak-valley-forming structure (see FIG. 2). Optical device 1L illustrated in FIG. 15 is a variation based on optical device 1J illustrated in FIG. 14, but the description below can also be applied to variations based on examples in other figures.

As with optical device 1K illustrated in FIG. 14, optical device 1L illustrated in FIG. 15 includes first glass panel 41 and second glass panel 42. Sealed space 43 is provided between first glass panel 41 and second glass panel 42. Optical adjuster 10 including first electrode 13, refractive index adjustment layer 15, and second electrode 14 is provided in sealed space 43. First glass panel 41, second glass panel 42, and sealed space 43 constitute glass panel unit 40. Glass panel unit 40 functions as what is called double glazing.

Optical device 1L illustrated in FIG. 15 includes transparency variable portion 20 that is variable between the state of being transparent and the state of being opaque. Transparency variable portion 20 may have variable reflective properties or may have variable absorption properties. Optical adjuster 10 is supported by second glass panel 42. Transparency variable portion 20 is provided in sealed space 43. Transparency variable portion 20 is supported by first glass panel 41. Transparency variable portion 20 is the same as or similar to that described above. With transparency variable portion 20, the optical device can be easily changed between the transparent state and the opaque state, and thus the optical properties can improve. Optical device 1L illustrated in FIG. 15 has the advantage of being easy to manufacture.

Transparency variable portion 20 is provided between third substrate 21 and fourth substrate 22. The material of fourth substrate 22 may be the same as the material of third substrate 21. Third substrate 21 and fourth substrate 22 can be formed using the same material as the material of first substrate 11. Third substrate 21 and first glass panel 41 are in contact with each other. As a result of third substrate 21 being bonded to first glass panel 41, first glass panel 41 supports transparency variable portion 20 via third substrate 21. Transparency variable portion 20 is connected to at least two lines 50 (third line 53 and fourth line 54). When power is supplied through third line 53 and fourth line 54, the transparency of transparency variable portion 20 can change. Third substrate 21 and fourth substrate 22 are substrates for transparency variable portion 20.

Optical adjuster 10 is supported by second glass panel 42. Second glass panel 42 and second substrate 12 are in contact with each other. Second substrate 12 is bonded to second glass panel 42. Optical device 1L illustrated in FIG. 15 is applicable to a window and has good optical properties.

Figure 16:
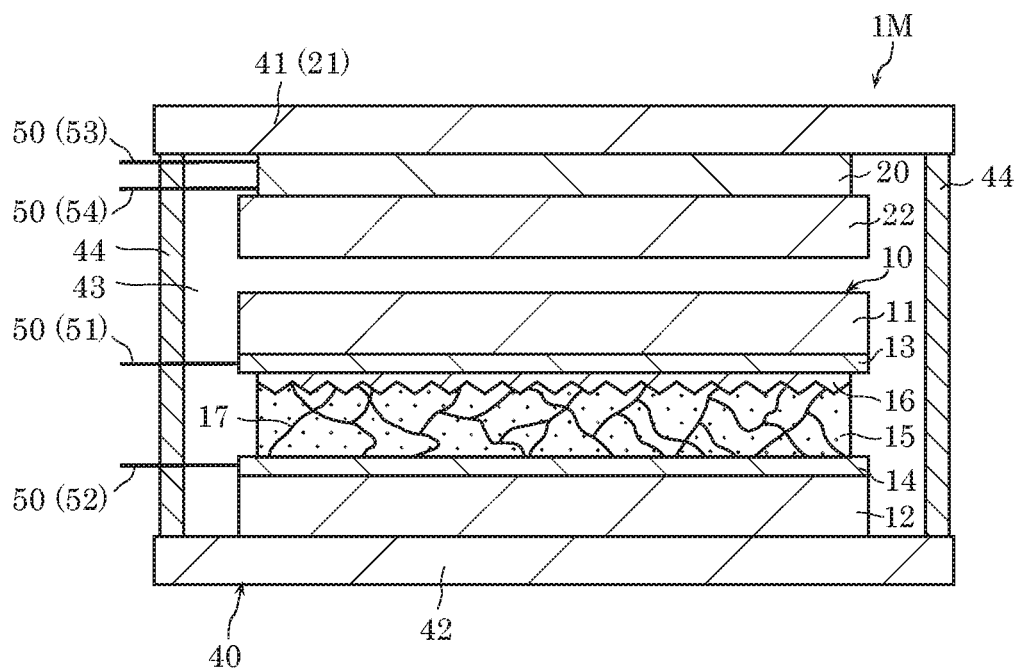
FIG. 16 is a cross-sectional view schematically illustrating an example of an optical device according to Variation 13 of an embodiment.

FIG. 16 is a cross-sectional view schematically illustrating an example of optical device 1M according to Variation 13 of the embodiment. Although an example of the direct peak-valley-forming structure is illustrated in FIG. 16, the description below can also be applied to the indirect peak-valley-forming structure (see FIG. 2). Optical device 1M illustrated in FIG. 16 is a variation based on optical device 1L illustrated in FIG. 15, but the description below can also be applied to variations based on examples in other figures.

In optical device 1M illustrated in FIG. 16, first glass panel 41 is a substrate for transparency variable portion 20. First glass panel 41 functions as third substrate 21. Furthermore, compared with optical device 1L illustrated in FIG. 15, optical device 1M illustrated in FIG. 16 includes a reduced number of parts and thus can have improved manufacturability. Moreover, optical device 1M illustrated in FIG. 16 is applicable to a window and has good optical properties.

Figure 17:
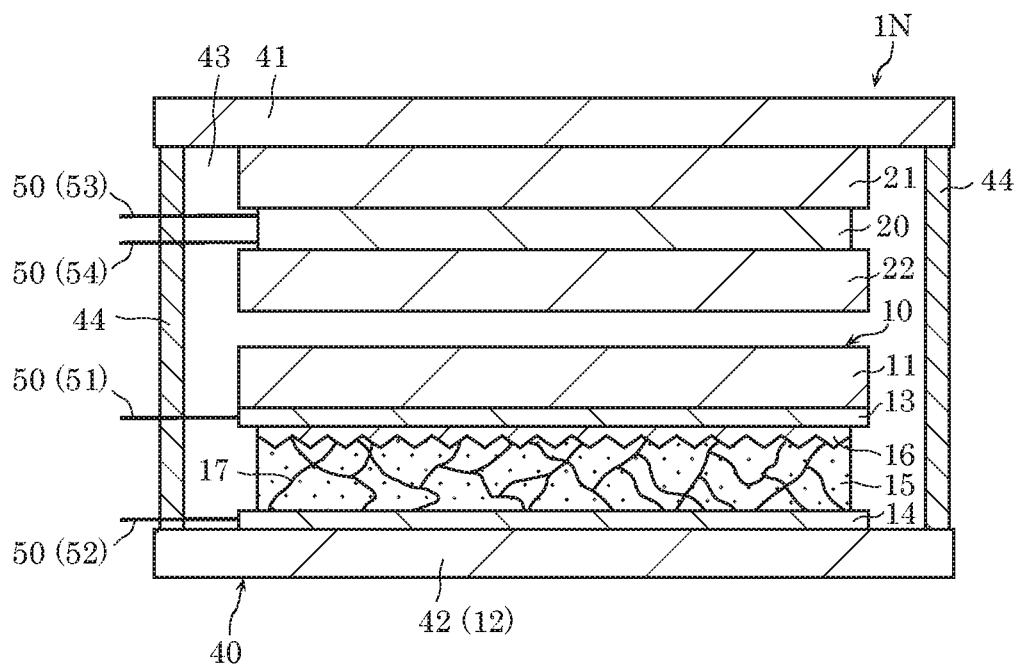
FIG. 17 is a cross-sectional view schematically illustrating an example of an optical device according to Variation 14 of an embodiment.

FIG. 17 is a cross-sectional view schematically illustrating an example of optical device 1N according to Variation 14 of the embodiment. Although an example of the direct peak-valley-forming structure is illustrated in FIG. 17, the description below can also be applied to the indirect peak-valley-forming structure (see FIG. 2). Optical device 1N illustrated in FIG. 17 is a variation based on optical device 1L illustrated in FIG. 15, but the description below can also be applied to variations based on examples in other figures.

In optical device 1N illustrated in FIG. 17, second glass panel 42 is second substrate 12. This means that second glass panel 42 functions as second substrate 12. Furthermore, compared with optical device 1L illustrated in FIG. 15, optical device 1N illustrated in FIG. 17 includes a reduced number of parts and thus can have improved manufacturability. Moreover, optical device 1N illustrated in FIG. 17 is applicable to a window and has good optical properties.

Note that another variation of FIG. 16 and FIG. 17 is optical device 1 in which first glass panel 41 serves as third substrate 21 and second glass panel 42 serves as second substrate 12. In this case, the number of parts can be further reduced, and thus the optical device can be advantageous in manufacture.

In an implementation in which optical adjuster 10 is embedded in glass panel unit 40 such as those illustrated in FIG. 14 to FIG. 17, a structure for enabling stable power supply can be formed. For example, a structure that supplies power from line 50 to electrode connection portion 19 through a material having good electrically conductive properties is preferable. In this case, the optical properties have improved in-plane uniformity and the voltage loss is reduced. Furthermore, in the case where sealing wall 44 includes a spacer, line 50 preferably extends between the spacer and the glass panel. In this case, the number of members of the line structure can be reduced. Alternatively in the case where sealing wall 44 includes a spacer, it is preferable that the spacer have a through-hole and line 50 extend through the through-hole. In this case, the sealing properties are improved.

A method for manufacturing optical device 1 according to the embodiment will be described with reference to FIG. 18A to FIG. 18F. FIG. 18A to FIG. 18F are cross-sectional views schematically illustrating the steps in the method for manufacturing optical device 1 according to the embodiment. Although the method for manufacturing optical device 1 illustrated in FIG. 1 is exemplified in FIG. 18A to FIG. 18F, the method can be applied to other variations. In FIG. 18A to FIG. 18F a configuration in the case where refractive index adjustment layer 15 contains a macromolecular material will be mainly described.

The method for manufacturing optical device 1 includes the steps of: forming first electrode 13 and resin layer 160; forming textured layer 16 from resin layer 160; forming second electrode 14; applying a material of refractive index adjustment layer 15; and bonding first substrate 11 and second substrate 12 together. In the step of forming first electrode 13 and resin layer 160, first electrode 13 and resin layer 160 are formed on first substrate 11. In the step of forming textured layer 16, peaks and valleys are imprinted into a surface of the resin layer to form textured layer 16 from resin layer 160 after resin layer 160 is formed. In the step of forming second electrode 14, second electrode 14 is formed on second substrate 12. In the step of applying the material of refractive index adjustment layer 15, the material of refractive index adjustment layer 15 is applied onto (i) one of textured layer 16 and first electrode 13 or (ii) second electrode 14. In the step of bonding first substrate 11 and second substrate 12 together, first substrate 11 and second substrate 12 are bonded together with first electrode 13 and second electrode 14 opposite each other. In this method for manufacturing optical device 1, optical device 1 is efficiently manufactured.

Hereinafter, the method for manufacturing optical device 1 will be described below with reference to FIG. 18A to FIG. 18F.

Figure 18A:
FIG. 18A is a cross-sectional view schematically illustrating a step in a method for manufacturing an optical device according to an embodiment.
Figure 18B:
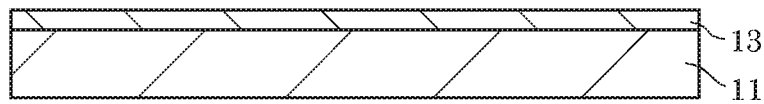
FIG. 18B is a cross-sectional view schematically illustrating a step in a method for manufacturing an optical device according to an embodiment.
Figure 18C:
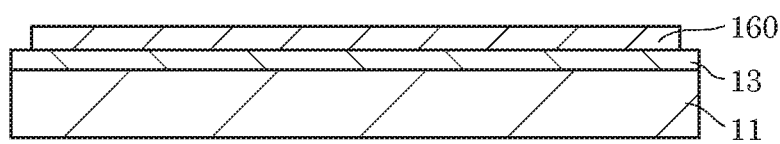
FIG. 18C is a cross-sectional view schematically illustrating a step in a method for manufacturing an optical device according to an embodiment.
Figure 18D:
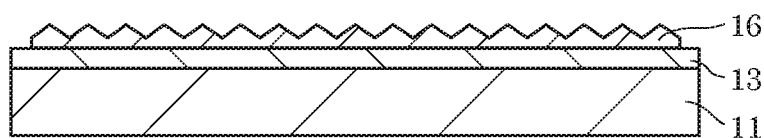
FIG. 18D is a cross-sectional view schematically illustrating a step in a method for manufacturing an optical device according to an embodiment.
Figure 18E:
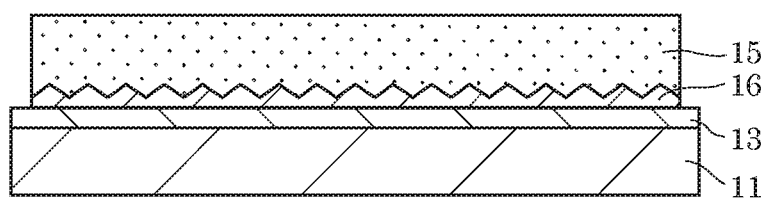
FIG. 18E is a cross-sectional view schematically illustrating a step in a method for manufacturing an optical device according to an embodiment.
Figure 18F:
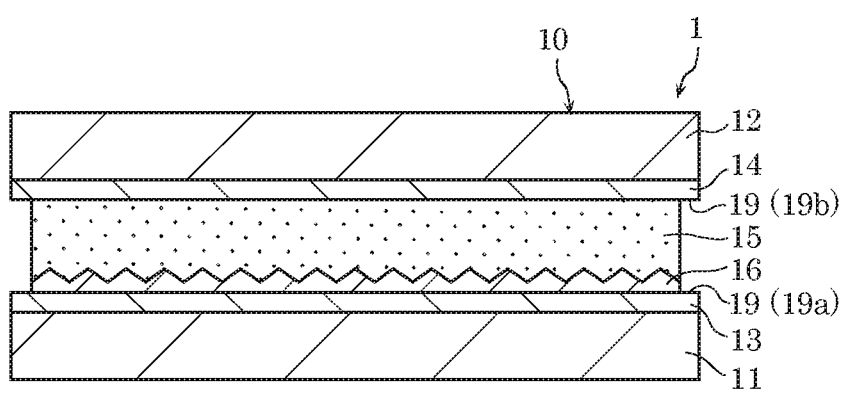
FIG. 18F is a cross-sectional view schematically illustrating a step in a method for manufacturing an optical device according to an embodiment.

First, first substrate 11 is prepared as illustrated in FIG. 18A. Next, as illustrated in FIG. 18B, first electrode 13 is formed on first substrate 11. Although not illustrated in the drawings, first electrode connection portion 19a can be formed at the same time as first electrode 13. Next, as illustrated in FIG. 18C, resin layer 160 is formed on first electrode 13. Resin layer 160 is formed by applying the material of resin layer 160, for example. The resin material constituting resin layer 160 can include one or both of an ultraviolet curable resin and a thermosetting resin. Resin layer 160 is preferably formed using an electrically conductive material. Peaks and valleys are then provided to resin layer 160 as illustrated in FIG. 18D. The peaks and the valleys can be provided by imprinting. Imprinting allows fine peaks and valleys to be accurately formed. Nanoimprinting is more preferred to provide the peaks and the valleys. In this case, the peaks and the valleys can be formed in resin layer 160 by transfer of nanosized peaks and valleys. When the peaks and the valleys are provided to resin layer 160, resin layer 160 is changed into textured layer 16. For example, the peaks and the valleys are transferred as a result of resin layer 160 being cured in the state in which uncured resin layer 160 is pressed by a textured die. Next, the material of refractive index adjustment layer 15 is applied onto textured layer 16 as illustrated in FIG. 18E. The material of refractive index adjustment layer 15 can include a macromolecular material or low molecules (for example, monomers) that form a macromolecular material. Refractive index adjustment layer 15 can include an ultraviolet curable resin and liquid crystals. First substrate 11 and second substrate 12 are then bonded together as illustrated in FIG. 18F. Second substrate 12 is prepared in advance. Similarly to FIG. 18B, second electrode 14 is formed on second substrate 12. At the same time as second electrode 14, second electrode connection portion 19b can be formed. An adhesive can be used to bond first substrate 11 and second substrate 12 together. At this time, first electrode 13 and second electrode 14 are located opposite to each other. Refractive index adjustment layer 15 is provided between first electrode 13 and second electrode 14. Note that refractive index adjustment layer 15 may include a spacer (see FIG. 4). In the case where refractive index adjustment layer 15 contains an ultraviolet curable resin, refractive index adjustment layer 15 is irradiated with ultraviolet light at the end so that the ultraviolet curable resin in refractive index adjustment layer 15 is cured, forming macromolecular polymer structure 17 (see FIG. 7). The irradiation of ultraviolet light may be performed before first substrate 11 and second substrate 12 are bonded together. Optical device 1 is manufactured in this way.

The method for manufacturing optical device 1 illustrated in FIG. 18A to FIG. 18F can be modified as follows. In FIG. 18A to FIG. 18C, first electrode 13 and resin layer 160 are formed on first substrate 11 in the stated order, but resin layer 160 may be formed on first substrate 11, and after peaks and valleys are provided to resin layer 160 to change resin layer 160 into textured layer 16, first electrode 13 may be formed on textured layer 16. In this case, optical device 1A having the indirect peak-valley-forming structure such as that in FIG. 2 can be formed. In the case of the indirect peak-valley-forming structure, a textured structure may be formed at a time on both of resin layer 160 and first electrode 13 by imprinting after resin layer 160 and first electrode 130 are formed on first substrate 11. The material of refractive index adjustment layer 15 can be applied onto first electrode 13. Although the material of refractive index adjustment layer 15 is applied onto textured layer 16 in FIG. 18A to FIG. 18F the material of refractive index adjustment layer 15 may be applied onto second electrode 14. Note that the material of refractive index adjustment layer 15 can also be provided by a method of injecting the material of refractive index adjustment layer 15 to a gap provided between first electrode 13 and second electrode 14 upon bonding first substrate 11 and second substrate 12 together.

Optical device 1 produced as illustrated in FIG. 18A to FIG. 18F is optical adjuster 10 itself. By using optical adjuster 10 obtained as described above, it is possible to form optical device 1 including other optical portions (transparency variable portion 20 and light emitter 30). Other optical portions can be stacked with optical adjuster 10 in the thickness direction. By embedding optical adjuster 10 in glass panel unit 40, it is possible to form an optical device including glass panel unit 40 (see FIG. 15). At this time, as illustrated in FIG. 15, optical adjuster 10 can be provided between first glass panel 41 and second glass panel 42, and these two glass panels can be bonded, for example.

Figure 19A:
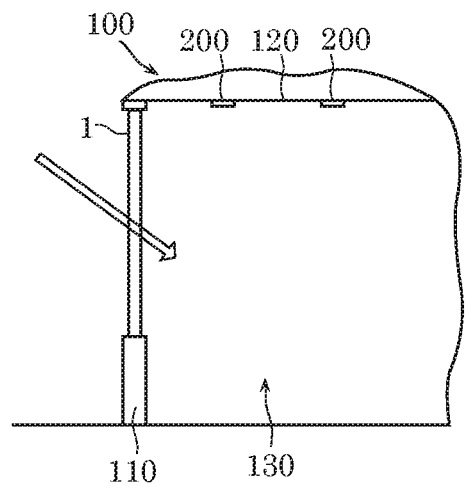
FIG. 19A illustrates an example of an optical device according to an embodiment that is in a transparent state in the case where the optical device is applied to a building.
Figure 19B:
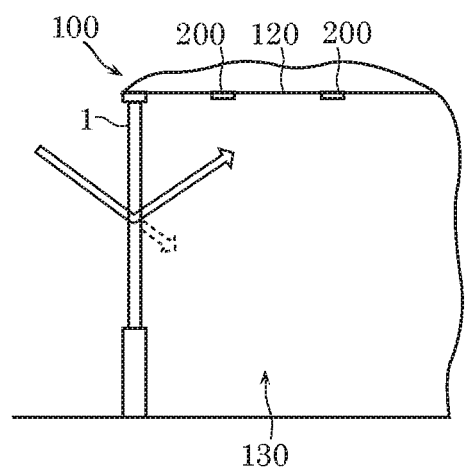
FIG. 19B illustrates an example of an optical device according to an embodiment that is in a light distribution state in the case where the optical device is applied to a building.
Figure 19C:
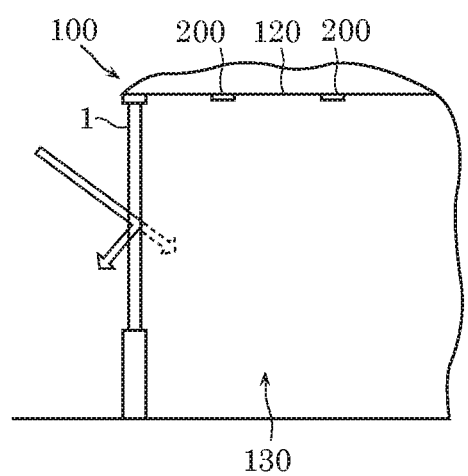
FIG. 19C illustrates an example of an optical device according to an embodiment that is in a shield state in the case where the optical device is applied to a building.

FIG. 19A to FIG. 19C illustrate an example in which optical device 1 described above is applied. FIG. 19A illustrates an example of an optical device in an optical state when optical device 1 according to the embodiment is applied to building 100; FIG. 19A illustrates the transparent state, FIG. 19B illustrates the light distribution state, and FIG. 19C illustrates the shield state.

In FIG. 19A to FIG. 19, an example in which optical device 1 is fitted onto wall 110 of building 100 is illustrated. Wall 110 is an exterior wall, for example. Building 100 has ceiling 120, and luminaire 200 is installed on ceiling 120. The inside of building 100 is defined as indoor area 130. In the present application example, optical device 1 functions as a window.

As illustrated in FIG. 19A, outside light enters indoor area 130 through optical device 1 in the state in which optical device 1 is transparent. The outside light is usually sunlight. Optical device 1 is in an optical state similar to, for example, the optical state of a glass window. At this time, indoor area 130 becomes bright with incident light, but, for example, in the case where indoor area 130 is large in depth, indoor area 130 is not likely to become entirely bright. Therefore, in a building having a glass window, luminaire 200 is often ON to illuminate indoor area 130 even during daytime In the state in FIG. 19B, optical device 1 has light distribution properties. In this case, optical device 1 can change the direction of travel of light so that light traveling in a direction in which traveling light is likely to reach a deep part of indoor area 130 is generated or increased. In FIG. 19B, light is changed to a direction toward ceiling 120. The light traveling obliquely downward passes through optical device 1 and becomes light traveling obliquely upward. Note that since the light distribution occurs not completely, but partially there may be light bent toward ceiling 120 and light traveling straight ahead. At this time, the main component of light is preferably light bent by the light distribution. When light is distributed as illustrated in FIG. 19B, light reaches an inward part of indoor area 130, and thus even a deep part (a location far from optical device 1) of indoor area 130 becomes bright. Accordingly, luminaire 200 can be OFF or the power consumption of luminaire 200 can be reduced, meaning that energy can be saved.

In the state in FIG. 19C, optical device 1 has shielding properties. In this case, it becomes less likely that light will reach indoor area 130 because of being reflected off optical device 1. By shielding light, it is possible to provide thermal insulation properties. When the thermal insulation properties are improved, heating and cooling efficiency increases, meaning that energy can be saved. With a configuration that exhibits such reflective properties as to reflect part of light while allowing passage of part of the light as in FIG. 19C, it is possible to adjust the amount of light that reaches indoor area 130. Adjusting the amount of light that enters indoor area 130 is effective when light outside dazzles. With a configuration in which light is blocked by optical device 1 with increased reflective properties, an object present on the opposite side of optical device 1 is less visible, and thus optical device 1 can function as a curtain. Optical device 1 can also be in the form of frosted glass by exhibiting the light scattering properties. In this case, it is also possible to switch between the transparent state in which the object placed on the opposite side of optical device 1 is clearly visible, the scattered state in which the object placed on the opposite side of optical device 1 is vaguely visible, and the opaque state in which the object placed on the opposite side of optical device 1 is completely invisible.

Note that when the optical device is configured to be able to include two or more areas in different optical states with split first electrode 13 or second electrode 14 such as those in FIG. 13 and FIG. 14, it is possible to control how light enters indoor area 130. In a possible example of the control, the window (optical device 1) allows easy passage of light at the upper portion while not allowing easy passage of light at the lower portion. Thus, an optical device having high optical properties can be obtained. Furthermore, with light emitter 30, the optical device can function as a lighting device. It is possible to provide an optical device that can be used both as a widow and as lighting. Moreover, it is also possible to use optical device 1 as a screen by increasing the contrast with the use of the scattering properties of optical device 1. Optical device 1 can be used in combination with a device that projects an image, such as a projector or an image projector, to allows an image to be projected on optical device 1.

Figure 20A:
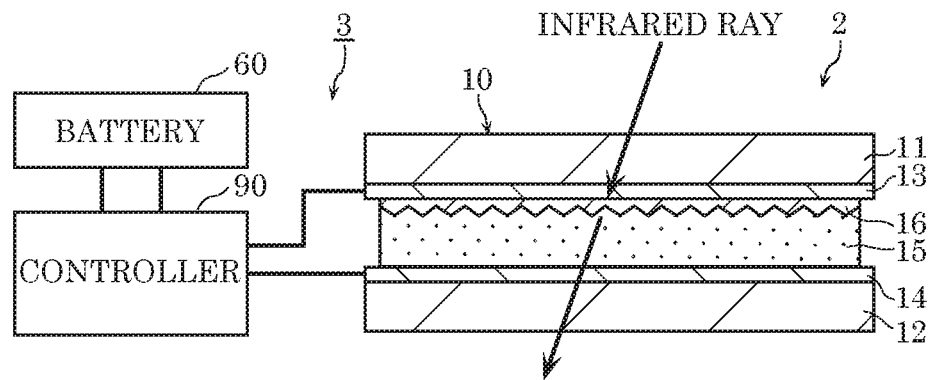
FIG. 20A schematically illustrates an example of an optical device controller including an optical device according to an embodiment in the case where the optical device is in a transparent state.
Figure 20B:
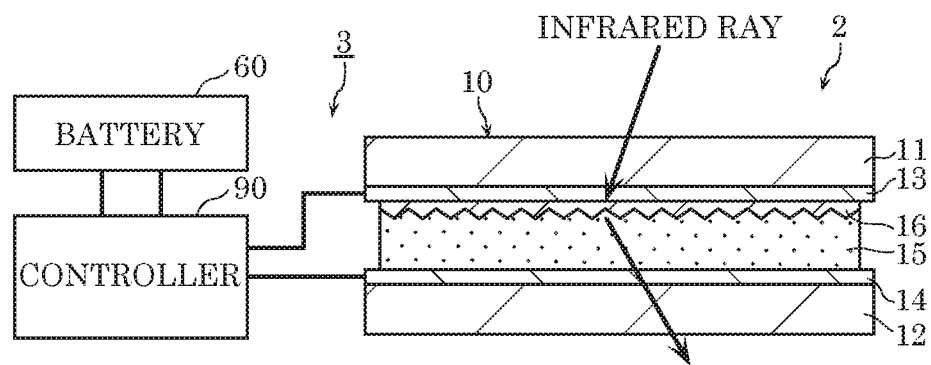
FIG. 20B schematically illustrates an example of an optical device controller including an optical device according to an embodiment in the case where the optical device is in a light distribution state.
Figure 20C:
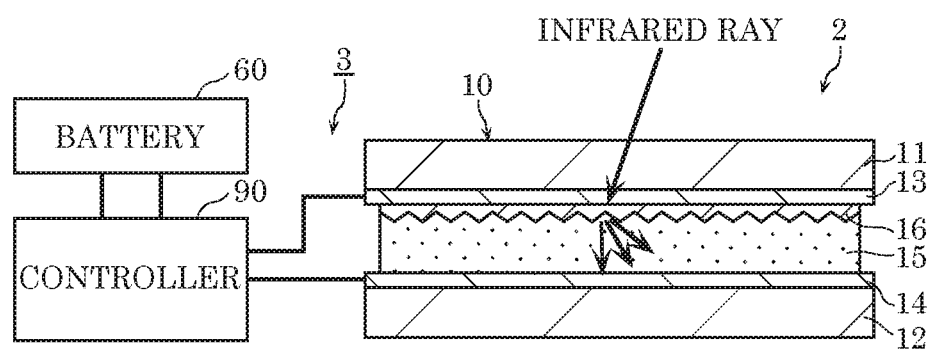
FIG. 20C schematically illustrates an example of an optical device controller including an optical device according to an embodiment in the case where the optical device is in a scattered state.

FIG. 20A to FIG. 20C schematically illustrate an example of optical device controller 3 including optical device 2 which is an example of the optical device according to the present embodiment; FIG. 20A illustrates optical device 2 in the transparent state; FIG. 20B illustrates optical device 2 in the light distribution state; and FIG. 20O illustrates optical device 2 in the scattered state.

Optical device 2 included in optical device controller 3 includes first electrode 13, second electrode 14, refractive index adjustment layer 15, and textured layer 16, as with optical device 1 illustrated in FIG. 1. Furthermore, optical device 2 includes first substrate 11 and second substrate 12.

Optical device 1 illustrated in FIG. 1 and optical device 2 illustrated in FIG. 20A to FIG. 20C have different refractive index adjustment layers 15. Specifically, the refractive index of refractive index adjustment layer 15 only in the visible light range among the visible light range and the near-infrared range is adjustable in optical device 1 illustrated in FIG. 1, while, the refractive index of refractive index adjustment layer 15 only in the near-infrared range among the visible light range and the near-infrared range is adjustable in optical device 2 illustrated in FIG. 20A to FIG. 20C. In other words, optical device 2 functions as a near-infrared control device that controls the direction of near-infrared light entering the device. In optical device 2, refractive index adjustment layer 15 allows the passage of near-infrared light. The refractive index of refractive index adjustment layer 15 in the visible light range is adjustable to (i) a refractive index close to the refractive index of textured layer 16 and (ii) a refractive index significantly different from the refractive index of textured layer 16. Note that in optical device 2, first electrode 13, second electrode 14, and textured layer 16 also allow the passage of near-infrared light. The near-infrared range is a range of wavelengths from 780 nm to 2500 nm, for example.

As with refractive index adjustment layer 15 in optical device 1 illustrated in FIG. 1, refractive index adjustment layer 15 changes into one of the transparent state, the light distribution state, and the scattered state as a result of a change in the refractive index through or not through the application of a voltage. This allows optical device 2 to switch to one of the transparent state, the light distribution state, and the scattered state.

FIG. 20A illustrates the travel of light (near-infrared light) through optical device 2 in the transparent state. In this case, light can travel in a direction oblique to a direction (that is the same as the thickness direction) perpendicular to a surface of optical device 1.

FIG. 20B illustrates the travel of light (near-infrared light) through optical device 2 in the light distribution state. In this case, the direction of travel of light incident on optical device 2 changes inside optical device 2. In FIG. 20B, the direction of travel of light traveling toward optical device 2 is changed to the backward direction (the rebound direction).

FIG. 20C illustrates how light (near-infrared light) travels through optical device 2 in the scattered state. In this case, light incident on optical device 2 is scattered while traveling, and thus the travel of strong light can be suppressed.

Note that refractive index adjustment layer 15 in optical device 2 preferably contains a liquid crystal material as a material for adjusting the refractive index. With this, it is possible to easily change the refractive index of refractive index adjustment layer 15 by controlling a voltage that is applied thereto, and thus the state of optical device 2 can be easily switched.

In the case where optical device 2 configured as described above is fitted as a window of a building, for example, optical device 2 can freely control solar radiation heat (infrared light) that is due to sunlight entering through the window. With this, the indoor temperature of the building can be adjusted to a comfortable level, and the heating and cooling cost can be reduced. For example, since rays of the sunlight can reach a deep part of the indoor area of the building, the entire room (especially the deep area of the room) can be warmed. Furthermore, in the case where the optical device is controlled so that the solar radiation heat (infrared light) reaches the entire floor of the room, feet in contact with the floor are warmed, and thus, the sensible temperature of the indoor area can be increased. As a result, the heating and cooling setting temperature can be lowered, and therefore the heating and cooling cost can be reduced.

Furthermore, optical device 2 can be configured as optical device controller 3. As illustrated in FIG. 20A to FIG. 20C and FIG. 21, optical device controller 3 includes: optical device 2 described above; sensor 70 that detects an amount of near-infrared light; and controller 90 that controls a voltage between first electrode 13 and second electrode 14 according to the amount of near-infrared light detected by sensor 70, for example.

Sensor 70 includes at least one of a first sensor that detects an amount of near-infrared light that enters optical device 2 and a second sensor that detects an amount of near-infrared light that is emitted from optical device 2.

Figure 21:
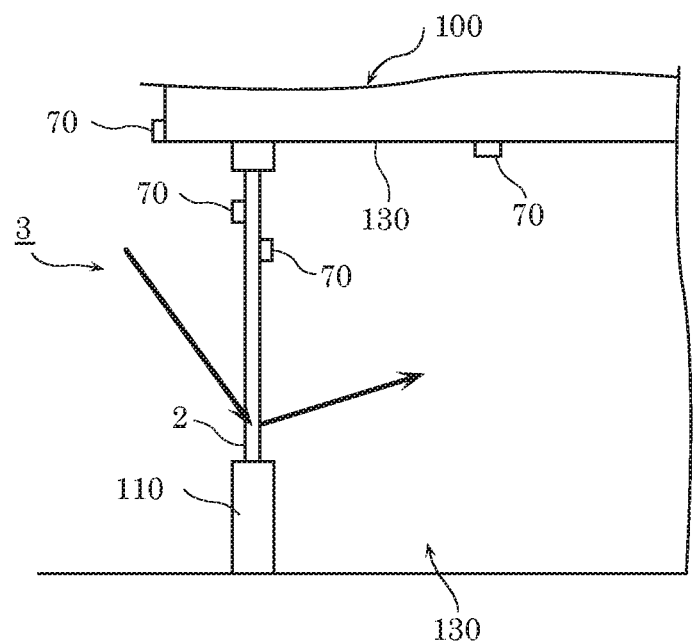
FIG. 21 illustrates another example of an optical device controller including an optical device according to an embodiment.

For example, as illustrated in FIG. 21, two sensors 70 can be installed outside of building 100 as the first sensor that detects the amount of near-infrared light that enters optical device 2. Furthermore, two sensors 70 can be installed in indoor area 130 of building 100 as the second sensor that detects the amount of near-infrared light that is emitted from optical device 2.

In this case, controller 90 illustrated in FIG. 20A to FIG. 20C controls a voltage that is applied to first electrode 13 and second electrode 14 according to the amount of near-infrared light detected by sensor 70. With this, it is possible to switch the state of optical device 2 (the transparent state, the light distribution state, and the scattered state), and thus the amount of light in indoor area 130 can be adjusted to an optimum value. In order to efficiently reduce heating and cooling energy lighting energy and the like, controller 90 may be operated in conjunction with a heating and cooling device, a lighting device, and the like installed in the indoor area.

As illustrated in FIG. 21, one of sensors 70 outside is installed on an upper part (such as a roof) of the building. With this, it is possible to accurately detect an amount of infrared light from the sun. Another one of sensors 70 outside is installed on optical device 2. With this, it is possible to relatively accurately detect the amount of infrared light from the sun and, because of being close to optical device 2, sensor 70 can be easily installed by simple construction work. In this cases, sensor 70 may be installed in a location that does not fall under the shadow, for example, other than the space under the eaves. One of sensors 70 in indoor area 130 is installed on optical device 2. With this, it is possible to evaluate the amount of incident infrared light while taking account, for example, of dirt on optical device 2 serving as a window, and thus an amount of infrared light in indoor area 130 can be accurately detected. Furthermore, in this case, sensor 70 can be easily installed by simple construction work because of being close to optical device 2. Another one of sensors 70 in indoor area 130 is installed on ceiling 120 in indoor area 130. With this, it is possible to detect the average amount of infrared light in indoor area 130, and thus the temperature of indoor area 130 can be easily controlled to a comfortable level. In addition, the accurate coverage of all sensors 70 is preferably upward angles up to 80 degrees with respect to the horizon so that infrared light from the sun can be easily detected.

Furthermore, as illustrated in FIG. 20A to FIG. 20C, optical device controller 3 may further include battery 60 that supplies power to first electrode 13 and second electrode 14 in optical device 2. With this, it is possible to use battery 60 to input a direct-current voltage that is applied to first electrode 13 and second electrode 14. When battery 60 is used to supply power to first electrode 13 and second electrode 14 as just described, optical device controller 3 can be provided by simple construction work, and since there is no longer need for a line for supplying power, a wire-free configuration becomes possible. Note that battery 60 may either be a primary battery or a secondary battery. A lithium-ion battery may be used as battery 60 because it has a high capacity. A solar cell may also be used as battery 60, but in this case, a rechargeable battery is used together so that optical device 2 can be controlled even when there is no sunshine.

Figure 22:
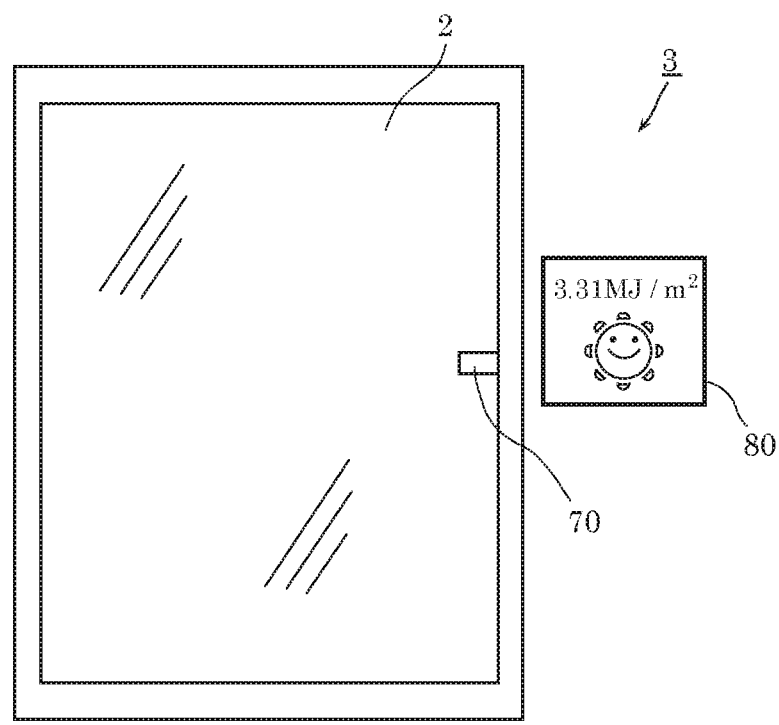
FIG. 22 illustrates yet another example of an optical device controller including an optical device according to an embodiment.

Furthermore, as illustrated in FIG. 22, optical device controller 3 may further include display 80 that displays the amount of near-infrared light detected by sensor 70. When the amount of near-infrared light is displayed on display 80, the amount of near-infrared light can be displayed as numerical values or pictures of characters, or the amount of near-infrared light can be displayed using both of them, as illustrated in FIG. 22. By displaying the amount of near-infrared light on display 80 as just described, it is possible to visualize the amount of infrared light which is invisible to users, Note that display 80 may be provided on a part of optical device 2 serving as a window or may be provided away from optical device 2.

Although the optical device and the optical device controller according to the present disclosure are described thus far based on the embodiment and the variations, the present disclosure is not limited to the embodiment and the variations described above. For example, embodiments obtained through various modifications to the embodiment and the variations described above which may be conceived by persons having ordinary skill in the art as well as embodiments resulting from arbitrary combination of the structural elements and functions of the embodiment and the variations described above without materially departing from the principles and spirit of the present disclosure are included in the present disclosure.

The invention claimed is:

1. An optical device, comprising:
    a first electrode that is light-transmissive;
    a second electrode that is light-transmissive and electrically paired with the first electrode;
    a refractive index adjustment layer provided between the first electrode and the second electrode and having a refractive index that is adjustable in an arbitrary wavelength band from a visible light range to a near-infrared range; and
    a textured layer in the form of a film that gives the refractive index adjustment layer an uneven surface,
    wherein the refractive index adjustment layer is variable between a transparent state and a light distribution state in which light passing through the optical device is bent in a specific direction, and
    wherein, in the light distribution state, incident light that obliquely enters the optical device is bent and a direction of travel of the incident light is changed to a backward direction.

2. The optical device according to claim 1,
    wherein the refractive index adjustment layer is variable to a state of being opaque.

3. The optical device according to claim 1, further comprising
    a transparency variable portion that is variable between a state of being transparent and a state of being opaque, wherein the first electrode is provided between the transparency variable portion and the refractive index adjustment layer.

4. The optical device according to claim 1, wherein at least one of the first electrode and the second electrode is split into a plurality of portions.

5. The optical device according to claim 1, wherein the first electrode is provided between the textured layer and the refractive index adjustment layer, and
the first electrode has a textured surface.

6. The optical device according to claim 1, wherein at least one of the first electrode and the second electrode includes an electrode connection portion extending beyond the textured layer in plan view.

7. A method for manufacturing the optical device according to claim 1, the method comprising:
forming the first electrode and a resin layer on a first substrate;
forming the textured layer from the resin layer by imprinting peaks and valleys into a surface of the resin layer after the formation of the resin layer;
forming the second electrode on a second substrate;
applying a material of the refractive index adjustment layer onto either one of (i) one of the textured layer and the first electrode and (ii) the second electrode; and
bonding the first substrate and the second substrate together with the first electrode and the second electrode opposite each other.

8. The optical device according to claim 1, wherein a difference in refractive index between the textured layer and the first electrode is 0.2 or less.

9. The optical device according to claim 1, wherein a difference in refractive index between the refractive index adjustment layer and the textured layer is 0.2 or less.

10. The optical device according to claim 1, wherein the refractive index of the refractive index adjustment layer in the visible light range is adjustable.

11. The optical device according to claim 10, wherein the refractive index adjustment layer is adjustable to (i) a refractive index close to a refractive index of the textured layer in the form of the film and (ii) a refractive index significantly different from the refractive index of the textured layer in the form of the film.

12. The optical device according to claim 1, wherein the refractive index adjustment layer has light scattering properties that are variable.

13. The optical device according to claim 12, wherein the refractive index adjustment layer is able to exhibit the light scattering properties in a state in which incident light is distributed.

14. The optical device according to claim 1, wherein the refractive index adjustment layer contains macromolecules.

15. The optical device according to claim 14, wherein the macromolecules form a polymer structure inside the refractive index adjustment layer,
the polymer structure includes a plurality of reaching points reaching a textured layer-side surface of the refractive index adjustment layer, the textured layer-side surface being one of surfaces of the refractive index adjustment layer that is nearest to the textured layer, and
an average distance between the plurality of reaching points is greater than an average peak-valley pitch of the textured layer.

16. The optical device according to claim 14, wherein the macromolecules in the refractive index adjustment layer increase in number in a direction away from the textured layer.

17. The optical device according to claim 1, further comprising
a light emitter.

18. The optical device according to claim 17, wherein light emitted from the light emitter is guided through the refractive index adjustment layer.

19. The optical device according to claim 1, wherein the textured layer is provided between the first electrode and the refractive index adjustment layer.

20. The optical device according to claim 19, wherein the refractive index adjustment layer includes a spacer, and
the spacer is larger than a pitch of peaks and valleys of the textured layer and defines a thickness of the refractive index adjustment layer.

21. The optical device according to claim 19, wherein the textured layer includes a plurality of columns, and
the plurality of columns penetrate the refractive index adjustment layer, are in contact with the second electrode, and define a thickness of the refractive index adjustment layer.

22. The optical device according to claim 1, wherein the textured layer includes irregular peaks and valleys.

23. The optical device according to claim 22, wherein the textured layer includes a plurality of peaks that protrude toward the refractive index adjustment layer, and
tips of the plurality of peaks protrude to aligned positions.

24. The optical device according to claim 1, further comprising:
a first glass panel; and
a second glass panel,
wherein a sealed space is provided between the first glass panel and the second glass panel, and
an optical adjuster including the first electrode, the refractive index adjustment layer, and the second electrode is provided in the sealed space.

25. The optical device according to claim 24, further comprising
a transparency variable portion that is variable between a state of being transparent and a state of being opaque,
wherein the optical adjuster is supported by the second glass panel, and
the transparency variable portion is provided in the sealed space and supported by the first glass panel.

26. The optical device according to claim 25, wherein the first glass panel is a substrate for the transparency variable portion.

27. The optical device according to claim 1, wherein the refractive index of the refractive index adjustment layer in the near-infrared range is adjustable.

28. The optical device according to claim 27, wherein the refractive index adjustment layer is adjustable to (i) a refractive index close to a refractive index of the textured layer in the form of the film and (ii) a refractive index significantly different from the refractive index of the textured layer in the form of the film.

29. An optical device controller, comprising:
the optical device according to claim 27;
at least one of a first sensor that detects an amount of near-infrared light that enters the optical device and a second sensor that detects an amount of near-infrared light that is emitted from the optical device; and a controller that controls a voltage between the first electrode and the second electrode according to the amount of near-infrared light detected by either one of the first sensor and the second sensor.

30. The optical device controller according to claim 29, further comprising a display that displays the amount of near-infrared light detected by either one of the first sensor and the second sensor.

31. The optical device controller according to claim 29, further comprising a battery that supplies power to the first electrode and the second electrode in the optical device.

32. The optical device controller according to claim 29, wherein the refractive index adjustment layer in the optical device contains a liquid crystal material as a material for adjusting the refractive index.

* * * * *